US011757923B1

(12) United States Patent
Vandeventer et al.

(10) Patent No.: US 11,757,923 B1
(45) Date of Patent: Sep. 12, 2023

(54) APPARATUS AND METHOD FOR INTELLIGENT PROCESSING OF CYBER SECURITY RISK DATA

(71) Applicant: Second Sight Data Discovery, Inc., Bloomington, IN (US)

(72) Inventors: Reuben Vandeventer, Bloomington, IN (US); David Imrem, Bloomington, IN (US)

(73) Assignee: Second Sight Data Discovery, Inc., Bloomington, IN (US)

( * ) Notice: Subject to any disclaimer, the term of this patent is extended or adjusted under 35 U.S.C. 154(b) by 0 days.

(21) Appl. No.: 17/963,914

(22) Filed: Oct. 11, 2022

(51) Int. Cl.
*H04L 29/00* (2006.01)
*H04L 9/40* (2022.01)

(52) U.S. Cl.
CPC ................ *H04L 63/1433* (2013.01)

(58) Field of Classification Search
CPC ....... H04L 67/30; H04L 63/1433; G06N 7/01; G06Q 10/0635; G06F 8/38
See application file for complete search history.

(56) References Cited

U.S. PATENT DOCUMENTS

| 7,617,519 | B2* | 11/2009 | Williams | G06F 16/9535 |
| | | | | 726/1 |
| 9,762,610 | B1* | 9/2017 | Kwan | H04L 63/20 |
| 9,954,883 | B2 | 4/2018 | Ahuja | |
| 10,901,578 | B2* | 1/2021 | Josephson | H04W 4/38 |
| 11,361,770 | B2* | 6/2022 | Neckermann | G10L 17/04 |
| 2001/0047406 | A1* | 11/2001 | Araujo | H04L 63/123 |
| | | | | 709/249 |
| 2012/0084276 | A1* | 4/2012 | Heimendinger | G06F 16/434 |
| | | | | 707/711 |
| 2013/0249917 | A1* | 9/2013 | Fanning | G06F 11/323 |
| | | | | 345/440 |
| 2013/0263102 | A1* | 10/2013 | Ergan | G06F 11/3495 |
| | | | | 717/158 |
| 2016/0234242 | A1* | 8/2016 | Knapp | G06F 21/55 |
| 2017/0093904 | A1* | 3/2017 | Ng | H04L 63/20 |
| 2018/0351987 | A1* | 12/2018 | Patel | G06F 21/577 |
| 2018/0375892 | A1* | 12/2018 | Ganor | H04L 63/20 |
| 2019/0035027 | A1* | 1/2019 | Ng | G06Q 40/08 |
| 2019/0102714 | A1* | 4/2019 | Albert | G06N 7/01 |

(Continued)

FOREIGN PATENT DOCUMENTS

EP 3188443 A3 7/2017

*Primary Examiner* — Don G Zhao
(74) *Attorney, Agent, or Firm* — Caldwell Intellectual Property Law, LLC

(57) ABSTRACT

An apparatus and method for intelligent processing of cyber security risk assessment data are provided. The apparatus includes a processor and a memory communicatively coupled to the at least a processor. The memory contains instructions configuring the at least a processor to receive a cyber profile associated with a digital environment. The processor is also configured to generate a cyber profile summary of the cyber profile data and generate a user interface data structure including the cyber profile summary and the cyber profile. A graphical user interface (GUI) is communicatively connected to the processor and the GUI is configured to receive the user interface data structure including the cyber profile summary and the cyber profile and display the cyber profile summary on a first portion of the GUI.

20 Claims, 7 Drawing Sheets

(56) References Cited

U.S. PATENT DOCUMENTS

| | | | |
|---|---|---|---|
| 2019/0236661 A1* | 8/2019 | Hogg | G06F 16/9537 |
| 2021/0124844 A1* | 4/2021 | Ghazinour Naini | |
| | | | G06F 21/6263 |
| 2021/0400078 A1* | 12/2021 | Ng | G06Q 40/06 |
| 2022/0006840 A1* | 1/2022 | Ng | G06N 20/00 |
| 2022/0327541 A1* | 10/2022 | Seguritan | G06Q 20/4016 |
| 2022/0359041 A1* | 11/2022 | Lee | G16B 40/00 |

* cited by examiner

APPARATUS AND METHOD FOR INTELLIGENT PROCESSING OF CYBER SECURITY RISK DATA

FIELD OF THE INVENTION

The present invention generally relates to the field of cyber security. In particular, the present invention is directed to apparatuses and methods for intelligent processing of cyber security risk assessment data.

BACKGROUND

Cyber security has become increasingly important as much of the world's information is stored digitally. Modern cyber security solutions include a wide array of variables to account for to ensure networks and highly sensitive data are secure. Graphical user interfaces (GUI) are often used to present important data to computer network administrators. Such GUIs are often limited in the information the GUI is able to provide to network administrators and resources are wasted including the representatives time necessary to process this information and determine and locate further information that may be needed.

SUMMARY OF THE DISCLOSURE

In an aspect, an apparatus for intelligent processing of cyber security risk assessment data is provided. The apparatus includes a processor and a memory communicatively coupled to the at least a processor. The memory contains instructions configuring the at least a processor to receive a cyber profile associated with a digital environment. The processor is also configured to generate a cyber profile summary of the cyber profile data and generate a user interface data structure including the cyber profile summary and the cyber profile. A graphical user interface (GUI) is communicatively connected to the processor and the GUI is configured to receive the user interface data structure including the cyber profile summary and the cyber profile and display the cyber profile summary on a first portion of the GUI.

In another aspect, a method for intelligent processing of cyber security risk assessment data is provided. The method includes receiving, by a processor, a cyber profile associated with a digital environment. The method also includes generating a cyber profile summary of the cyber profile data and generating a user interface data structure including the cyber profile summary and the cyber profile. Further, the method includes receiving, by a graphical user interface (GUI), the user interface data structure including the cyber profile summary and the cyber profile and displaying, by the GUI, the cyber profile summary on a first portion of the GUI.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for intelligent processing of cyber security risk data. A further aspect of the present disclosure provides a tailored, interactive graphical user interface (GUI) presented to a network administrator, decisionmaker, and the like for a digital environment. Information displayed by the apparatus in the GUI, including a cyber profile summary, risk profile summary, cyber security weakness, and cyber security adjustment, allows the decision maker to efficiently and in a structured manner review data associated with the digital environment. Aspects of the current disclosure allow for efficient and accurate evaluation of cyber security data associated with digital environments.

Figure 1:
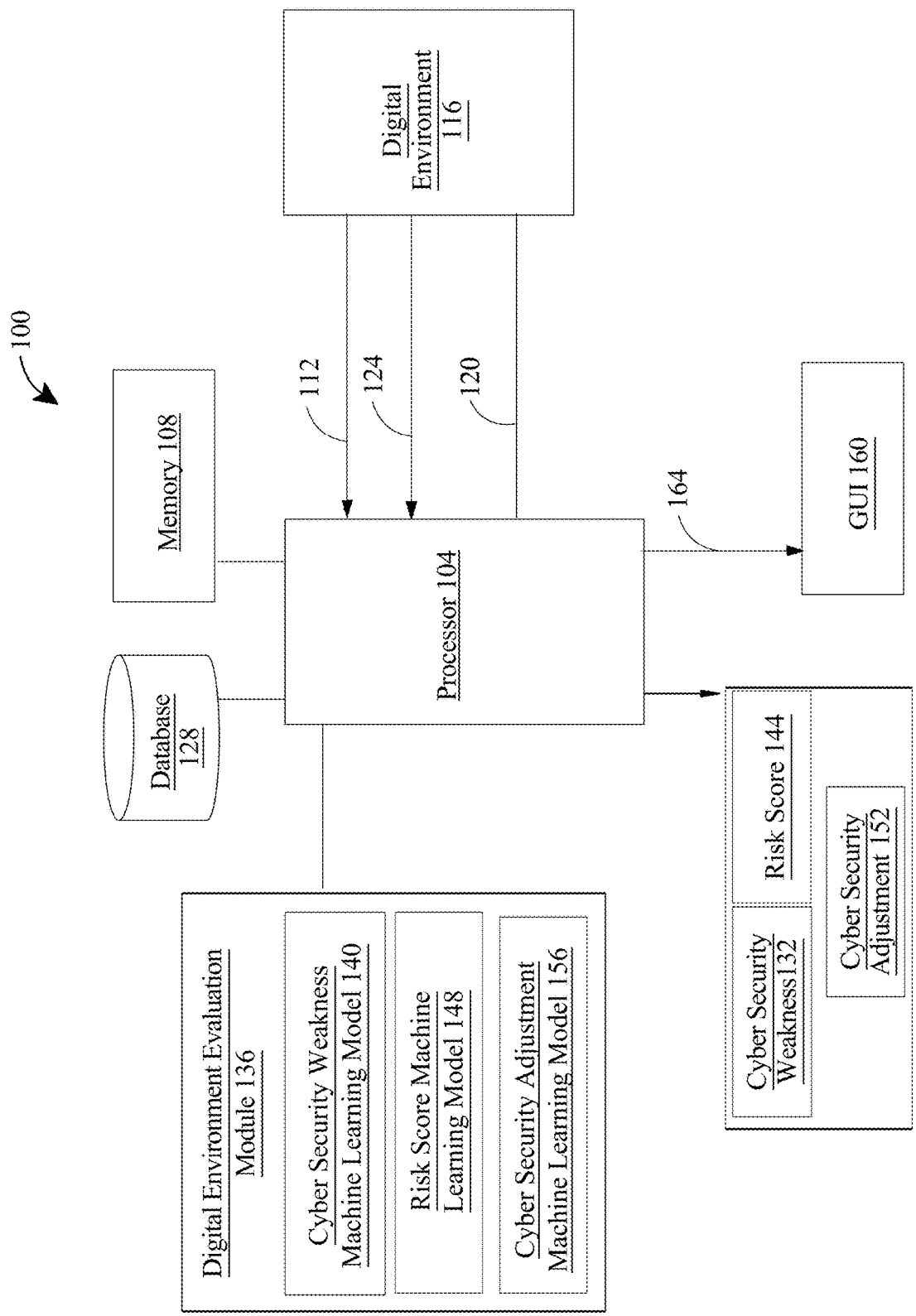
FIG. 1 is a block diagram of an apparatus for determining a risk associated with a cyber-attack.

Referring now to FIG. 1, an exemplary embodiment of an apparatus 100 for intelligent processing of cyber security risk assessment data is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 104 and/or computing device may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

With continued reference to FIG. 1, processor 104 may further comprise and/or be included in a server. A server may include a computing device and/or a plurality of computing devices that provides functionality for other programs or devices. A server may provide various functionalities such as sharing data or resources and performing computation among multiple other programs and or devices. Servers may include database servers, file servers, mail servers, print servers, web servers, and/or application servers. In an embodiment, the server may communicate with a digital environment through a communication network. A communication network may include a network interface card (e.g., a mobile network interface card, a LAN card), a modem, and any combination thereof. A communication network may also include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wired and/or wireless mode of communication. In general, any network topology may be used. Information may be communicated to and/or from digital wallet through a communication network. In a non-limiting example, processor 104 may include security protections against software or software and hardware attacks, including without limitation attack scenarios in which a malicious actor may attempt to extract cryptographic keys for purpose of spoofing the key, the modify computer code, data or memory structures or similar; such protections may include, without limitation, a secure computing module or elements thereof as disclosed in further detail below. Processor 104 may also include public/private key pairs or other cryptographic key pairs, including without limitation symmetric public keys, elliptic curve based, keys, asymmetric public keys, and the like, or mechanisms to create them, for purposes of cryptographically authenticating the validity of processor 104 to another device, authenticating the validity of secure software loaded onto the device, or other data, including without limitation inputs, outputs, time of loading, and/or time of execution of software, boot sessions, or the like.

Still referring to FIG. 1, processor 104 is configured to receive a cyber profile 112 from a digital environment 116. A "digital environment," for the purpose of this disclosure is an integrated communications environment where digital devices communicate and manage data and interactions within digital environment 116. Digital device may be any computing device as described in this disclosure, for example as described in FIG. 6. For example, digital environment 116 may be one of a computer system, computer network, and the like. In an exemplary embodiment, digital environment 116 may include a plurality of user devices. A "user device," for the purpose of this disclosure, is any additional computing device, such as a mobile device, laptop, desktop computer, or the like. In a non-limiting embodiment, user device may be a computer and/or smart phone operated by a user in a remote location. User device may include, without limitation, a display; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device may include a graphical user interface (GUI) configured to display any information from apparatus 100 and/or any computing device. In some embodiments, digital environment 116 may also include any electronically based asset associated with digital environment 116, as described in more detail below. For example, electronically based digital assets may be computer programs, data, data stores, and the like, but are not limited to such examples. Digital environment 116 may be connected to processor 104 by a network 120, as described in more detail below.

With continued reference to FIG. 1, cyber profile 112 may be an input into apparatus 100. As used in this disclosure, a "cyber profile" is a collection of data and/or information about digital assets associated with digital environment. As used in this disclosure, a "digital asset" is any electronically based asset associated with and interconnected within digital environment 116. For example, digital assets may include servers, databases, and computing main frames for digital environment 116. In a further exemplary embodiment, digital assets may also include computer-based programs, computer program data, and the like. Each digital asset may be connected by a communication network. Communication network 120 may include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network 120 may employ a wired and/or wireless mode of communication. Further, digital environment 116 may employ any type of network architecture. For example, digital environment 116 may employ a peer to peer (P2P) architecture where each computing device in a computing network is connected with every computing device in the network and every computing device acts as a server for the data stored in the computing device. In a further exemplary embodiment, digital environment 116 may also employ a client server architecture where a computing device is implemented as a central computing device (e.g., server) that is connected to each client computing device and communication is routed through the central computing device. However, the network architecture is not limited thereto. One skilled in the art will recognize the various network architectures that may be employed by the digital environment. Further, any network topology may be used. For example, digital environment 116 may employ a mesh topology where a computing device is connected to one or multiple other computing devices using point to point connections. However, the network topology is not limited thereto. One skilled in the art will recognize the various network architectures that may be employed by the digital environment.

With further reference to FIG. 1, users may have permission to access digital assets within digital environments. Digital assets may be accessed by users in a number of different way. For example, digital assets may be a software as a service (SaaS, thin-client computing device, thick client computing device, and the like. In other exemplary embodiments, a user may be required to use login credentials to access digital assets. The login in credentials may be any of login credentials at an organization level (e.g., all users for the organization use the same log in credentials) and/or individual log in credentials. One skilled in the art will recognize the various methods for user access to digital environments that may be employed by digital environment 116. In an embodiment, at least a portion of each digital asset may also be installed on each user device associated with each user. In an exemplary embodiment, digital assets may also be hosted on a central computing device to be accessed using user devices connected to the central server. Further, digital environment 116 may employ one of a private network and a virtual private network (VPN) to establish a secure connection between digital assets and the user.

Continuing to reference FIG. 1, in an example, cyber profile 112 may include categories such as digital asset profile data for digital assets associated with digital environment. As used in this disclosure, "digital asset profile data" is specification data, program data, and the like for digital assets in digital environment 116. In an exemplary embodiment, digital profile data may include a number of computer programs used in digital environment 116, a number of computing devices, and the like. Further, digital asset profile data may be associated with a risk level. For example, a larger number of computer devices may indicate an increased risk level based on more areas of susceptibility to cyber-attack associated with more computing devices. Cyber profile 112 data categories may also include user data associated with digital assets. As used in this disclosure, "user data" is any information and/or data related to user access within digital environment 116. For example, user data may include a number of users with access to a digital asset, identities of users with access to a digital asset, a level of access users have to digital asset, a type of access associated with users, and the like. In an exemplary embodiment, users with a higher level and/or type of access (e.g., access to more digital assets, higher levels of access, and/or more secure digital assets) may indicate an increased risk level based on the increased access to the digital assets. As used in this disclosure, "level of access" is a set of permissions and/or restrictions that are associated with each user associated with digital environment 116. Further, as used in this disclosure, "type of access" is a classification for each user account and the level of access associated with each classification for users connected to digital environment 116. In a further exemplary embodiment, users with a lower level and/or type of access (e.g., access to less digital assets, lower levels of access, and/or less secure digital assets) may indicate a decreased risk level based on the lesser access to the digital assets. Further, cyber profile 112 categories may also include protective asset data. As used in this disclosure, "protective asset data" is a collection of digital data and/or information about protective measures digital environment may have in place to protect digital assets. For example, protective asset data may include data about anti-malware applications, firewalls, access restrictions, security protocols, and the like. In an exemplary embodiment, protective asset data associated with an increased level of protective assets (e.g., higher firewall settings, access restrictions, and the like) may indicate a decreased risk level. In a further exemplary embodiment, protective asset data associated with a decreased level of protective assets (e.g., lower firewall settings, access restrictions, and the like) may indicate an increased risk level based on lesser access to digital assets.

With further reference to FIG. 1, processor 104 is configured to receive risk profile 124 from the digital environment 116. As used in this disclosure, "risk profile" is a collection of digital data and/or information associated with security of a digital environment 116. For example, risk profile 124 may include categories such as cyber-attack protection data, degree of single points of failure data, cyber-attack recovery protocol data, and digital environment risk record but are not limited to such examples. One skilled in the art will recognize other categories of data that may be risk profile data 124. Cyber profile 112 and risk profile 124 data may be stored in a database 128. Database 128 is discussed in further detail below.

Continuing to reference FIG. 1, "cyber-attack protection data" as used in this disclosure is data related to security measures in place for digital environment 116 to prevent a cyber-attack. In an exemplary embodiment, cyber-attack protection data may include a number of users with access to digital environment, a level of access for each user, security protocols, security protocol levels, and the like. For example, cyber-attack protection data may include digital data and/or information about protective measures and user restrictions implemented in digital environment. As used in this disclosure, "degree of single points of failure data" is data indicating a level of failure associated with each digital assets in the event of a cyber-attack and/or failed operation of digital asset. Further, degree of single points of failure data may include impact of failure data. For example, impact of failure data may include data describing a level of failure of a digital environment based on different potential cyber-attacks and different potential points of failure in digital assets. In an embodiment, impact of failure data may include instances of when a point of failure may cause interruption on a small scale (e.g., at a department level, etc.), a medium scale (e.g., at an office level, etc.), and a large scale (e.g., at an entire company level, etc.). As used in this disclosure, "cyber-attack recovery protocol data" is data indicating recovery measures in place that may be used for digital environment 116 to recover in the event of a cyber-attack. In addition, cyber-attack recovery protocol data may include data associated with the recovery of a digital environment after a potential cyber-attack. For example, cyber-attack recovery protocol data may include data about recovery protocols that may be used such as data backup information, an amount of time needed for digital assets to recover, and the like. In a non-limiting embodiment, risk profile 124 may include a digital environment risk record. As used in this disclosure, "digital environment risk record" is data associated with an indication of a level of preparedness for preventing and resolving issues associated with a cyber-attack associated with digital environment. Determined digital environment risk record may also include data indicating a probability of an adverse event on the digital environment (e.g., a cyber-attack or interruption to operation continuity of the digital environment). For instance and without limitation, digital environment risk record may be consistent with digital environment risk record in U.S. patent application Ser. No. 17/963,805, filed on Oct. 11, 2022, and entitled, "APPARATUS AND METHOD FOR DETERMINING A RISK ASSOCIATED WITH A CYBER-ATTACK," which is incorporated by reference herein in its entirety.

Continuing to refer to FIG. 1, processor 104 may be configured to detect at least cyber security weakness 132 in digital environment 116. As used in this disclosure, a "cyber security weakness" is an area of digital environment 116 with increased susceptibility to a cyber-attack and needs supplemental action to protect digital environment 116 against cyber-attack. The susceptibility to cyber-attack may be related to an aspect of cyber profile 112 and/or risk profile 124 for digital environment 116. In an embodiment, processor 104 may be configured to detect at least one cyber security weakness 132 for digital environment 116 based on the comparison of categorical data for cyber profile 112 and risk profile 124 with the corresponding categorical data. For example, cyber-attack recovery protocol data for digital environment 116 may be compared to corresponding cyber-attack recovery protocol data for other digital environments and processor 104 may detect an indication the cyber-attack recovery protocol data may require further attention to secure the digital environment 116 based on the comparison and identify the cyber-attack recovery protocol data as an cyber security weakness of the at least one cyber security weakness 132 for the digital environment 116.

With further reference to FIG. 1, processor 104 may be configured to detect at least one cyber security weakness 132 for digital environment 116 based on risk profile category data 124. In an exemplary embodiment, processor 104 may be configured to use at least one of cyber-attack protection data, degree of single points of failure data, and cyber-attack recovery protocol data to determine at least one cyber security weakness 132. For example, processor 104 may be configured to compare each of cyber-attack protection data, degree of single points of failure data, and cyber-attack recovery protocol data with corresponding cyber-attack protection data, degree of single points of failure data, and cyber-attack recovery protocol data for other digital environments and determine which of cyber-attack protection data, degree of single points of failure data, and cyber-attack recovery protocol data may be an cyber security weakness based on the comparison, as described above. Additionally, or alternatively, processor 104 may be configured to determine at least one cyber security weakness 132 based on cyber profile 112. In an exemplary embodiment, processor 104 may be configured to use at least one of digital asset profile data, user data associated with digital assets, protective asset data, cyber-attack protection data, degree of single points of failure data, and cyber-attack recovery protocol data to detect at least one cyber security weakness for digital environment 116. For example, processor 104 may be configured to compare each of digital asset data, protective asset data, cyber-attack protection data, cyber-attack protection data, degree of single points of failure data, and cyber-attack recovery protocol data with corresponding digital asset data, protective asset data, cyber-attack protection data, cyber-attack protection data, degree of single points of failure data, and cyber-attack recovery protocol data for separate digital environments and determine which of digital asset data, protective asset data, cyber-attack protection data, cyber-attack protection data, degree of single points of failure data, and cyber-attack recovery protocol data may be an cyber security weakness based on the comparison, as described above. Additionally, or alternatively, processor 104 may be configured to determine a cyber profile category security weakness for each category of cyber profile (e.g., digital asset profile data, user data associated with digital assets, protective asset data). As used in this disclosure, "cyber profile category security weakness" is a portion of cyber profile that is susceptible to a cyber-attack and needs supplemental action to protect digital environment against cyber-attack. Additionally, or alternatively, processor 104 may be configured to determine a risk profile category security weakness for each category of risk profile (e.g., cyber-attack protection data, degree of single points of failure data, and cyber-attack recovery protocol data). As used in this disclosure, "risk profile category security weakness" is a portion of risk profile that is susceptible to a cyber-attack and needs supplemental action to protect digital environment against cyber-attack. Further, at least one cyber security weakness may include each cyber profile category security weakness and risk profile category security weakness.

Continuing to reference FIG. 1, processor 104 may use a machine learning module, such as digital environment evaluation module 136, to implement one or more algorithms or generate one or more machine-learning models, such as cyber security weakness machine learning model 140, to detect at least one cyber security weakness 132 for digital environment 116. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user such as a digital environment administrator and/or a digital security administrator. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Digital environment evaluation module 136 may be used to generate cyber security weakness machine learning machine learning model 140 and/or any other machine learning model, such as risk score machine learning model described below, using training data. Cyber security weakness machine learning model 140 may be trained by correlated inputs and outputs of training data. Training data may be data sets that have already been converted whether manually, by machine, or any other method. Training data may include previous outputs such that cyber security weakness machine learning model 140 iteratively produces outputs. Cyber security weakness machine learning model 140 using a machine-learning process may output converted data based on input of training data.

In an embodiment, analyzing cyber profile and risk profile may include detecting at least one cyber security weakness 132 for digital environment 116 based on at least one of the cyber profile 112 and risk profile 124 using a machine learning model, such as cyber security weakness machine learning model 140 generated by digital environment evaluation module 136. Cyber security weakness machine learning model 140 may be trained by training data, discussed in further detail below, such as cyber security weakness training data. Cyber security weakness training data may be stored in a database 128. Database 128 is discussed in further detail below.

With continued reference to FIG. 1, detecting the at least one cyber security weakness 132 using a machine learning model may include receiving cyber security weakness training data. In an embodiment, cyber security weakness training data may include a plurality of risk profile 124 data and/or cyber profile 112 data that are each correlated to one of a plurality of digital environment cyber security weakness data. For example, cyber security weakness training data may be used show how risk profile data may indicate a strength or weakness in cyber security in digital environment. In a further embodiment, cyber security weakness training data may also include a plurality of cyber profile data that are each correlated to one of a plurality of digital environment cyber security weakness data. In such an embodiment, cyber security weakness training data may be used show how cyber profile data may indicate a strength or weakness in cyber security in digital environment. Detecting the at least one cyber security weakness 132 using a machine learning model may further include training a cyber security weakness machine learning model 140 as a function of cyber security weakness training data. Further, detecting the at least one cyber security weakness 132 using a machine learning model may also include detecting at least one cyber security weakness using trained cyber security weakness machine learning model. Alternatively, or additionally, digital environment evaluation module 136 may use a cyber security weakness classifier to classify digital asset data, user data associated with digital assets, protective asset data, cyber-attack protection data, degree of single points of failure data, and cyber-attack recovery protocol data according to a type of cyber security weakness. For example, types of digital security deficiencies may include system misconfigurations, authorization credential weaknesses, software vulnerabilities, and the like. In an exemplary embodiment, system misconfigurations may include digital assets having vulnerable settings or disparate security controls. Authorization credential weaknesses may include accessing digital environment using user credentials that were not protected and/or obtained through malfeasance. Software vulnerabilities may include unauthorized access to digital environment through vulnerabilities in older, unpatched software. One skilled in the art will recognize various other types of digital security deficiencies that may exist. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a process whereby a processor 104 derives a classifier from training data, such as cyber security weakness training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Continuing to refer to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l = \sqrt{\Sigma_{i=0}^{n} a_i^2}$ where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. Cyber security weakness classifier may classify cyber profile data and risk profile to one or more types and/or category of resulting cyber-attack, which may include any type of cyber-attack, sub-categories and/or more specific categories, or the like. For instance, cyber security weakness classifier may receive cyber profile data and/or risk profile data with resulting cyber-attacks that occurred and may classify according to type of cyber-attack such as malware, denial-of-service, or the like. Cyber security weakness classifier may be trained using training data correlating cyber profile data and risk profiles in digital environments to a type of cyber-attack.

Still referring to FIG. 1, processor 104 may be configured to determine a cyber profile category cyber security weakness for each category of cyber profile. In an embodiment, at least one cyber security weakness 132 may comprise cyber profile category cyber security weakness for each category of cyber profile. Additionally, or alternatively, processor 104 may be configured to determine cyber profile category cyber security weakness for each category of cyber profile using cyber security weakness machine learning model 140 generated by digital environment evaluation module 136. As used in this disclosure, "cyber profile category cyber security weakness" is an area of a cyber profile that has an increased level of vulnerability to cyber-attack. In an embodiment, categories of cyber profile may be digital asset data, user data associated with digital assets, and protective asset data, as described above, and processor 104 may be configured to determine a cyber profile category cyber security weakness for digital asset profile data, user data associated with digital assets, and protective asset data using the cyber security weakness machine learning model 140. However, processor 104 may be configured to determine a cyber profile category cyber security weakness for any category of data associated with cyber profile. Processor 104 may be configured to receive cyber profile category cyber security weakness training data that correlates a plurality of historical cyber profile category data to each of a plurality of historical cyber profile category cyber security weakness data, train cyber security weakness machine learning model 140 as a function of cyber profile category cyber security weakness training data, and determines a cyber profile category cyber security weakness for each category of cyber profile using trained cyber security weakness machine learning model 140. In an embodiment, cyber security weakness machine learning model 140 may be trained using cyber profile category cyber security weakness training data to determine a relationship between an input of a plurality of cyber profile category data to calculate an output of a cyber profile category cyber security weakness.

Continuing to refer to FIG. 1, processor 104 may be configured to determine a risk profile category cyber security weakness for each category of risk profile. In an embodiment, at least one cyber security weakness 132 may comprise risk profile category cyber security weakness for each category of risk profile. Additionally, or alternatively, processor 104 may be configured to determine risk profile category cyber security weakness for each category of profile using cyber security weakness machine learning model 140. As used in this disclosure, "risk profile category cyber security weakness" is data for an area of a risk profile that has an increased level of vulnerability to cyber-attack. In an embodiment, categories of risk profile category data may be cyber-attack protection data, degree of single points of failure data, and cyber-attack recovery protocol data, as described above, and processor 104 may be configured to determine a risk profile category cyber security weakness for cyber-attack protection data, degree of single points of failure data, and cyber-attack recovery protocol data using cyber security weakness machine learning model 140. However, processor 104 may be configured to determine a risk profile category cyber security weakness for any category of data associated with risk profile category data With continued reference to FIG. 1, processor 104 may be configured to receive risk profile category cyber security weakness training data that correlates a plurality of risk profile category data to a corresponding risk profile category cyber security weakness of a plurality of risk profile category cyber security weaknesses, train cyber security weakness machine learning model as a function of risk profile category cyber security weakness training data, and determine a risk profile category cyber security weakness for each category of risk profile using trained cyber security weakness machine learning model 140. In an embodiment, cyber security weakness machine learning model 140 may be trained using risk profile category cyber security weakness training data to determine a relationship between an input of a plurality of risk profile category data to calculate an output of risk profile category cyber security weakness.

With further reference to FIG. 1, processor 104 may be configured to calculate a risk score 144 based on cyber profile 112 and risk profile 124. In an embodiment, risk score may be calculated based on at least one cyber security weakness 132, as described above. Risk score 144 may be an indication of a probability of an adverse event on digital environment (e.g., a cyber-attack or interruption to operation continuity of the digital environment) associated with different components/portions of digital environment. Additionally, or alternatively, risk score may be an indication of preparedness for cyber-attack for digital environment 116 for different components/portions of digital environment. In an embodiment, risk score 148 may include a ranking out of five stars, out of a scale of 1-10, a percentage score, and the like. For example, a digital environment with a risk score of "63" may be an indication digital environment is more susceptible to a cyber-attack than a digital environment with a risk score of "87". Alternatively, or additionally, risk score 144 may be an alphabetic score, such as, but not limited to, "A+", "A", "A−", "B+", "B", "B−", C+", "C", "C−", "D+", "D", "D−", "F", and the like. In such an embodiment, a digital environment with a risk score of "D" may be an indication digital environment is more susceptible to a cyber-attack compared to a digital environment with a risk score of "B−."

With continued reference to FIG. 1, in an embodiment, risk score 144 may be calculated as a function of at least one of cyber profile 112 data and risk profile 124 data using a machine learning model, discussed in further detail below and in FIG. 4, such as risk score machine learning model 148 generated by protection plan module 136. Risk score machine learning model 148 may be trained by training data, discussed in further detail in FIG. 4, such as risk score training data. Risk score training data may be stored in a database 128. Database 128 is discussed in further detail below.

With continued reference to FIG. 1, calculating the risk score 144 using a machine learning model may include receiving risk score training data from database 128. In an embodiment, risk score training data may include a plurality of risk profile data that are each correlated to one of a plurality of risk score data. In a further embodiment, risk score training data may also include a plurality of cyber profile data that are each correlated to one of a plurality of risk score data. Additionally, or alternatively, risk score training data may include a plurality of cyber security weakness data that are each correlated to one of a plurality of risk score data Determining the risk score using a machine learning model may further include training a risk score machine learning model 148 as a function of risk score training data. Further, determining the risk score using a machine learning model may also include determining the risk score using trained risk score machine learning model. Alternatively, or additionally, a fuzzy inferencing system for determination of digital environment risk score may be employed, where any or all digital environment risk scores may be represented as values and/or fuzzy sets for linguistic variables measuring the same, as described in more detail in FIG. 5. An inferencing system may use one or more fuzzy inferencing rules, as described below in FIG. 5, to output one or more linguistic variable values and/or defuzzified values indicating risk score overall or according to categories.

Still referring to FIG. 1, processor 104 may be configured to determine a cyber profile category risk score for each category of cyber profile, such as digital asset profile data, user data associated with digital assets, protective asset data, and at least one cyber security weakness for each category. Additionally, or alternatively, processor 104 may be configured to determine cyber profile category risk score for each category of cyber profile using risk score machine learning model 148 generated by risk assessment module 136. As used in this disclosure, "cyber profile category risk score" is an indication of a level of preparedness for preventing and resolving issues associated with a cyber-attack associated with a specific category of cyber profile data, such as digital asset profile data, user data, and protective asset data, and at least one cyber security weakness for each category. The determined cyber profile category risk score may also be an indication of a probability of an adverse event on digital environment associated with a specific category of cyber profile data and the at least one cyber security weakness for each category. In an exemplary embodiment, categories of the cyber profile may be digital asset data, user data associated with digital assets, and protective asset data, as described above, and processor 104 may be configured to determine a cyber profile category risk score for digital asset data, user data associated with the digital assets, and protective asset data using risk score machine learning model 148. However, processor 104 may be configured to determine a cyber profile category risk score for any category of data associated with cyber profile and/or at least one cyber security weakness for each category.

With further reference to FIG. 1, processor 104 may be configured to receive cyber profile category risk score training data that correlates a plurality of cyber profile category data and to each of a plurality of cyber profile category risk scores, train risk score machine learning model 144 as a function of cyber profile category risk score training data, and determines a cyber profile category risk score for each category of cyber profile using trained risk score machine learning model 144. In an embodiment, risk score machine learning model 144 may be trained using cyber profile category risk score training data to determine a relationship between an input of a plurality of risk assessment category data to calculate an output of a cyber profile category risk score.

Continuing to refer to FIG. 1, processor 104 may be configured to determine a risk profile category risk score for each category of risk profile. Additionally, or alternatively, processor 104 may be configured to determine risk profile category risk score for each category of risk profile category data using risk score machine learning model 144. As used in this disclosure, "risk profile category risk score" is an indication of a level of preparedness for preventing and resolving issues associated with a cyber-attack associated with a specific category of risk profile 124. The determined risk profile category risk score may also be an indication of a probability of and identification of a cyber security weakness that may lead to an adverse event on digital environment associated with specific category of risk profile 124. In an embodiment, categories of the risk profile category data may be cyber-attack protection data, degree of single points of failure data, and cyber-attack recovery protocol data, as described above, and processor 104 may be configured to determine a risk profile category risk score for cyber-attack protection data, degree of single points of failure data, and cyber-attack recovery protocol data using risk score machine learning model 144. However, processor 104 may be configured to determine a risk profile category risk score for any category of data associated with risk profile category data. In an exemplary embodiment, for cyber-attack protection data, training data indicating a greater level of protection (e.g., higher firewall settings, limited user access, and the like) may be correlated to a higher risk assessment category risk score. Further, training data indicating a lesser level of protection (e.g., lower firewall settings, greater user access, and the like) may be correlated to a lower risk profile category risk score (e.g., lower numerical and/or alphabetic score). In a further exemplary embodiment, training data indicating a greater single point of failure (e.g., a larger portion of digital environment would lose functionality in a cyber-attack) may be correlated with a lower risk profile category risk score. Further, training data indicating a lesser single point of failure (e.g., a smaller portion of digital environment would lose functionality) may be correlated with a higher risk profile category risk score. In another further exemplary embodiment, training data indicating implementation of greater cyber-attack recovery protocols (e.g., data is backed up and can be recovered quickly, and the like) may be correlated with a greater risk profile category risk score (e.g., higher numeric and/or alphabetic score). Further, training data indicating implementation of lower levels cyber-attack recovery protocols (e.g., data is not backed up and can be recovered quickly, and the like) may be correlated with a lower risk profile category risk score.

With continued reference to FIG. 1, processor 104 may be configured to receive risk profile category risk score training data that correlates a plurality of risk profile category data to a corresponding risk profile category risk score of a plurality of risk profile category risk scores, train risk score machine learning model as a function of risk profile category risk score training data, and determine a risk profile category risk score for each category of risk profile using trained risk score machine learning model 140. In an embodiment, risk score machine learning model 140 may be trained using risk profile category risk score training data to determine a relationship between an input of a plurality of risk profile category data to calculate an output of risk profile category risk score.

Still referring to FIG. 1, in an embodiment, each cyber profile category risk score and risk profile category risk score may be a fuzzy set and/or a value of linguistic variables. "Linguistic variables" may, in a non-limiting example, cover input value factors and the "defuzzified" output may represent a score or output indicating how likely a cyber-attack is or, via a functional output or threshold comparison, be used to make a determination of a cyber profile category risk score and/or risk assessment category risk score. Linguistic variables may represent, for instance, degree of protective asset data, single point of failure data, or any other variable that may affect a probability of successful prevention of a cyber-attack. Combinations of input variables and/or member functions may be linked to and/or composed with output membership functions and/or functional output formulas such as TSK functions to generate a defuzzified probability of success, and/or score to be compared to a threshold. Any parameters, biases, weights or coefficients of membership functions may be tuned and/or trained using machine-learning algorithms as described in this disclosure. Fuzzy inferencing and logic is further described herein with reference to FIG. 5.

Continuing to reference FIG. 1, processor 104 may be configured to determine a contribution score for each category of risk profile category data based on an effect of data on risk score. For example, processor 104 may determine that cyber-attack recovery protocol data may have a largest effect on risk score 144 compared to other categories of risk profile and assign a contribution score indicating a significant effect on risk score 144. Alternatively, or additionally, processor 104 may be configured to determine a contribution score for each category of cyber profile based on an effect on risk score 144. In an exemplary embodiment, cyber profile category data with the most effect on risk score may be a category of cyber profile that has the most detrimental effect on risk score 144. For example, processor 104 may determine that digital assets may have the greatest negative effect on risk score because there are a large number of digital assets, and the digital assets are vulnerable to cyber-attacks and assign a contribution score indicating a significant effect on risk score. In an exemplary embodiment, cyber profile and risk profile category data with a higher contribution score (e.g., 95, A−, and the like) may be a category of data of risk profile that has a more detrimental effect on risk score. In a further exemplary embodiment, risk profile category data with a lower contribution score (e.g., 47, C−, and the like) may be a category of data of cyber profile and risk profile that has the least detrimental effect on risk score 144. In an embodiment, contribution score may include a ranking out of five stars, out of a scale of 1-10, a percentage score, and the like. Alternatively, or additionally, digital environment risk score 128 may be an alphabetic score, such as, but not limited to, "A+", "A", "A−", "B+", "B", "B−", "C+", "C", "C−", "D", "D−", "F", and the like.

With further reference to FIG. 1, processor 104 may be configured to generate a ranked list of risk profile categories based on contribution score for categories of risk profile. For example, processor 104 may generate an ordered list ranking degree of single points of failure data, cyber-attack protection data, and cyber-attack recovery protocol data in order from higher contribution scores to lower contribution scores. Such a list may indicate degree of single points of failure data having the most relevance and/or effect on risk score, cyber-attack protection data has less relevance than degree of single points of failure data but more relevance than cyber-attack recovery protocol data. Additionally, or alternatively, the processor 104 may also be configured to generate a ranked list of categories of cyber profile based on contribution scores for categories of cyber profile. For example, processor 104 may generate an ordered list ranking user data associated with digital assets, protective asset data, and digital asset data. Such a list may indicate user data associated with digital assets having the most relevance and/or effect on digital environment risk record, protective asset data has less relevance than user data associated with digital assets but more relevance than digital asset data. In an embodiment, processor 104 may be configured to generate ranked list of each of categories of risk profile and categories of cyber profile. For example, processor 104 may generate an ordered list ranking degree of single points of failure data, user data associated with digital assets, cyber-attack recovery protocol data, protective asset data, cyber-attack protection data, and digital asset data. Additionally, or alternatively, processor 104 may be configured to identify a category of cyber profile 112 and risk profile 124 with the greatest detrimental effect on risk score 144. In an embodiment, processor 104 may compare contribution score for each category of cyber profile 112 and risk profile 124 and determine which category has highest contribution score and output that category as category having the most detrimental effect on risk score 144.

With continued reference to FIG. 1, ranked list of risk profile data and cyber profile category data may be generated, as a non-limiting example, using a machine learning model. In an embodiment, machine learning model may receive training data correlating a plurality of risk profile category data, cyber profile category data, and/or contribution score to an effect of risk profile category data and cyber profile category data on correlated risk score. In a further embodiment, cyber profile category data and risk profile category data and/or types of business entities may be classified to categories or cohorts of cyber profile category data and risk profile category data and/or types of business entities, for which relative importance of risk categories may be stored and/or determined using further machine-learning methods, which can be used to determine ranked list of risk profile category data and cyber profile category data. For example, digital environment 116 may be associated and/or classified into a category for digital environments with similar risk profile category data and cyber profile data. In a further exemplary embodiment, digital environment 116 may be associated and/or classified with other digital environments in the same field of operation, for example medical insurance companies, and the like. Database 128 may also store data about relative importance of each of categories of risk profile category data and cyber profile category data for each of these categories and/or fields of operation. Additionally, or alternatively, a machine learning model may be used to determine relative importance of each of categories of risk profile category data and cyber profile category data for each of these categories and/or fields of operation.

With continued reference to FIG. 1, processor 104 may be configured to determine at least one cyber security adjustment 152 based on at least one cyber security weakness 128. As used in this disclosure, "cyber security adjustment" is an action to be performed in digital environment to address areas with increased susceptibility to cyber-attack within digital environment to reduce the likelihood and/or severity of a cyber-attack. In an embodiment, at least one cyber security adjustment 152 may also include any of cyber profile category cyber security adjustments and/or risk profile category cyber security adjustment, as described in more detail below, or any combination thereof. For example, at least one cyber security adjustment 152 may include adding digital assets to the digital environment, changes to existing digital assets, changes to user settings and access to digital assets, changes to network protective asset, but are not limited thereto. In an embodiment, at least one cyber security adjustment 152 may include a comprehensive list of all actions that may need to be implemented for digital environment 116, a portion of the comprehensive list, and the like. For example, at least one cyber security adjustment 152 may be updating to a newer version of an operating system in a digital asset with increased security measures. The at least one cyber security adjustment 152 may be stored in a database 128 to maintain a history and/or a checklist of at least one cyber security adjustment 152 to ensure implementation of each of the at least one cyber security adjustments 152. Database 128 is discussed in further detail below. For instance and without limitation, at least one cyber security adjustment 152 may be consistent with at least one recommended risk remediation action in U.S. patent application Ser. No. 17/963,805, filed on Oct. 11, 2022, and entitled, "APPARATUS AND METHOD FOR DETERMINING A RECOMMENDED CYBER-ATTACK RISK REMEDIATION ACTION," which is incorporated by reference herein in its entirety.

With continued reference to FIG. 1, processor 104 may be configured to use at least one of at least one cyber security weakness 132 for risk profile category data (e.g., cyber-attack protection data, degree of single points of failure data, and cyber-attack recovery protocol data) to determine the at least one cyber security adjustment 152. For example, processor 104 may be configured to determine at least one cyber security adjustment 152 that can be used to address the at least one cyber security weakness 132 for cyber-attack protection data, degree of single points of failure data, and cyber-attack recovery protocol data. Further, processor 104 may be configured to adjust the at least one cyber security adjustment 152 based on additional risk profile 124 data. For example, processor 104 may receive supplemental risk profile 124 data from digital environment and change the at least one cyber security adjustment 152 using the supplemental data. Additionally, or alternatively, processor 104 may be configured to determine the at least one cyber security adjustment 152 based on the cyber profile 112 category data (e.g., digital asset profile data, user data associated with the digital assets, and protective asset data). In an exemplary embodiment, processor 104 may be configured to use the at least one cyber security weakness 132 for at least one of the digital asset profile data, user data associated with the digital assets, and protective asset data to determine the at least one cyber security adjustment 152. For example, processor 104 may be configured to determine the at least one cyber security adjustment 152 that can be used to address the at least one cyber security weakness 132 for the digital asset profile data, user data associated with the digital assets, and protective asset data. Further, processor 104 may also be configured to adjust the at least one cyber security adjustment 152 based on additional cyber profile 112 data.

Figure 4:
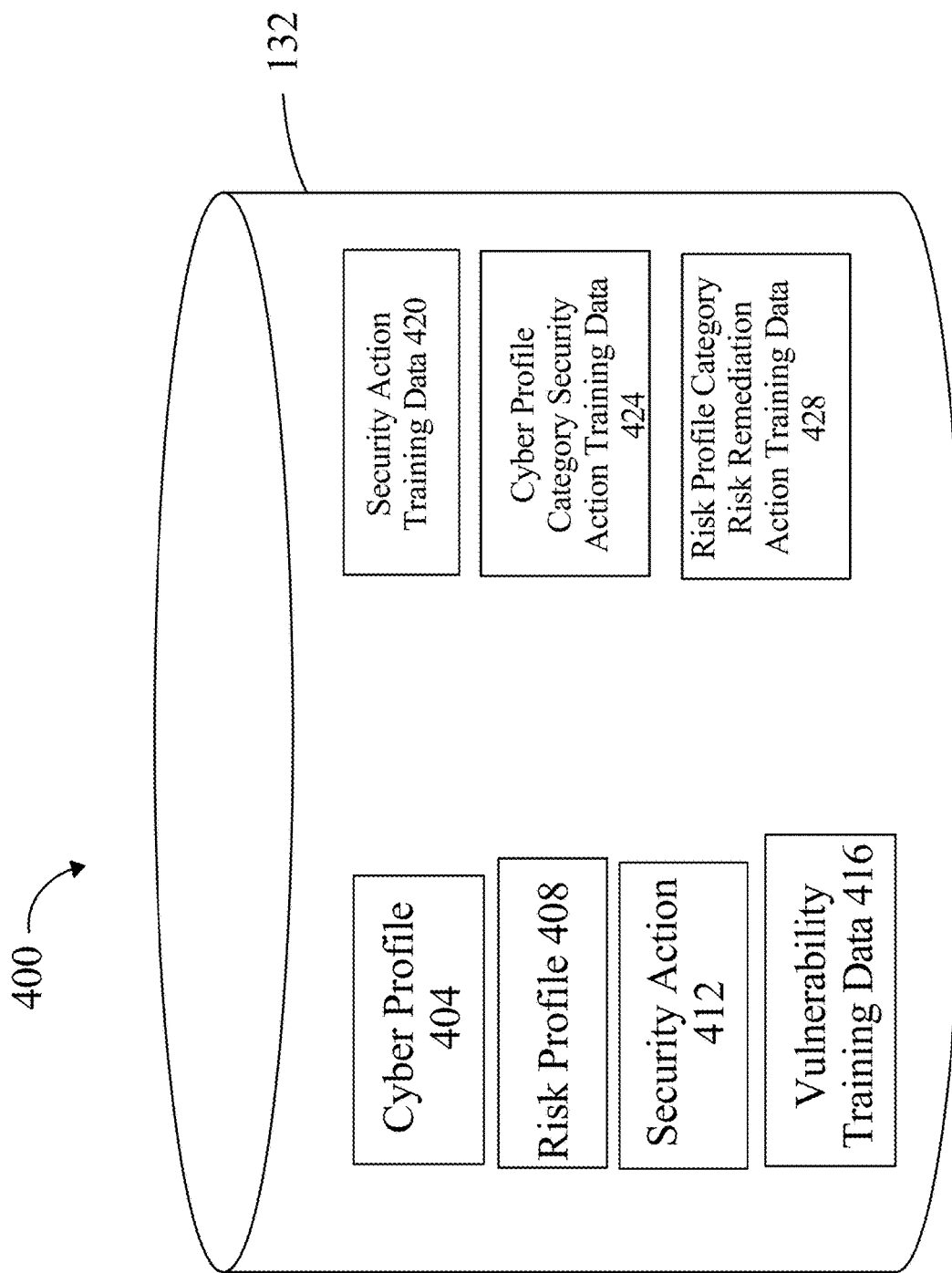
FIG. 4 is an exemplary embodiment of a database.

In an embodiment, at least one cyber security adjustment 152 may be determined as a function of the at least one cyber security weakness 132 for at least one of cyber profile 112 and risk profile 124 using a machine learning model, discussed in further detail in FIG. 4, such as cyber security adjustment machine learning model 156 generated by digital environment evaluation module 136. Cyber security adjustment machine learning model 156 may be trained by training data, discussed in further detail in FIG. 4, such as cyber security adjustment training data. Cyber security adjustment training data may be stored in a database 128. Database 128 is discussed in further detail below. Processor 104 may be configured to interpret and process any datum from database 128, for example cyber security adjustment training data.

With continued reference to FIG. 1, determining the at least one cyber security adjustment 152 using a machine learning model may include receiving cyber security adjustment training data. In an embodiment, cyber security adjustment training data may include a plurality of risk profile data that are each correlated to one of a plurality of cyber security adjustment data. In a further embodiment, cyber security adjustment training data may also include a plurality of cyber profile data that are each correlated to one of a plurality of cyber security adjustment data. Determining the at least one cyber security adjustment 152 using a machine learning model may further include training a cyber security adjustment machine learning model as a function of the cyber security adjustment training data. Further, determining the at least one cyber security adjustment 152 using a machine learning model may also include determining of digital environment cyber security adjustment using trained cyber security adjustment machine learning model. Alternatively, or additionally, a fuzzy inferencing system for determining of the at least one cyber security adjustment 128 may be employed, where any or all cyber security adjustments may be represented as values and/or fuzzy sets for linguistic variables measuring the same. An inferencing system may use one or more fuzzy inferencing rules, as described below in FIG. 6, to output one or more linguistic variable values and/or defuzzified values indicating digital environment risk record overall or according to categories.

Still referring to FIG. 1, processor 104 may be configured to determine a cyber profile category cyber security adjustment for each category of cyber profile using cyber security adjustment machine learning model 156. As used in this disclosure, "cyber profile category cyber security adjustment" is a recommended action for preventing and resolving issues associated with a cyber-attack associated with a specific category of cyber profile data (e.g., digital asset profile data, user data associated with the digital assets, protective asset data, and the like). According to an embodiment, cyber profile category cyber security adjustment may be a part of the cyber security adjustment 152 and may be any cyber security adjustment as described herein. In an embodiment, categories of cyber profile may be digital asset profile data, user data associated with the digital assets, and protective asset data, as described above, and processor 104 may be configured to determine a cyber profile category risk remediation action for digital asset data, user data associated with the digital assets, and protective asset data using cyber security adjustment machine learning model 156. However, processor may be configured to determine a cyber profile category cyber security adjustment for any category of data associated with cyber profile. Processor 104 may be configured to receive cyber profile category cyber security adjustment training data that correlates a plurality of cyber profile category data to each of a plurality of cyber profile category cyber security adjustments, train cyber security adjustment machine learning model 156 as a function of cyber profile category cyber security adjustment training data, and determine a cyber profile category cyber security adjustment for each category of cyber profile using trained cyber security adjustment machine learning model 156. In an embodiment, cyber security adjustment machine learning model 156 may be trained using cyber profile category cyber security adjustment training data to determine a relationship between an input of a plurality of cyber profile data to calculate an output of a cyber profile category cyber security adjustment.

Continuing to refer to FIG. 1, processor 104 may be configured to determine a risk profile category cyber security adjustment for each category of risk profile data using cyber security adjustment machine learning model 156. As used in this disclosure, "risk profile category cyber security adjustment" is a recommended action for preventing and resolving issues associated with a cyber-attack associated with a specific category of risk profile data. In an embodiment, processor 104 may be configured to determine a risk profile category risk remediation action for each category of risk profile in addition to each of the cyber profile risk remediation actions described above. Further, processor 104 may be configured to determine cyber profile category risk remediation actions and/or risk profile category risk remediation actions for any subset of categories for cyber profile and risk profile. As discussed above, categories of risk profile data may include cyber-attack protection data, degree of single points of failure data, cyber-attack recovery protocol data, digital environment risk record, and the like. According to an embodiment, each risk profile category cyber security adjustment may be a part of cyber security adjustment 152 and may be any cyber security adjustment as described herein. In an embodiment, categories of the risk profile data may be cyber-attack protection data, degree of single points of failure data, and cyber-attack recovery protocol data, as described above, and processor 104 may be configured to determine a risk profile cyber security adjustment for the cyber-attack protection data, degree of single points of failure data, and cyber-attack recovery protocol data using cyber security adjustment machine learning model 156. However, processor 104 may be configured to determine a risk profile cyber security adjustment for any category of data associated with risk profile data. In an exemplary embodiment, for cyber-attack protection data, processor 104 may receive data indicating a lower level of protection (e.g., lower firewall settings, greater user access, and the like) and determine a risk profile cyber security adjustment of increasing the firewall settings, decreasing user access, and the like. In a further exemplary embodiment, processor 104 may receive data indicating a greater single point of failure (e.g., a larger portion of digital environment would lose functionality) and determine a risk profile cyber security adjustment of changing a network architecture to reduce an effect on digital environment during an interruption of operation. In another further exemplary embodiment, processor 104 may receive data indicating implementation of lower levels of cyber-attack recovery protocols (e.g., data is not backed up and cannot be recovered quickly, and the like) and determine a risk profile cyber security adjustment of creating back up files and/or implement quicker methods of data recovery.

With continued reference to FIG. 1, processor 104 may be configured to receive risk profile remediation action training data that correlates a plurality of risk profile data to each of a plurality of risk profile cyber security adjustments, train cyber security adjustment machine learning model as a function of risk profile cyber security adjustment training data, and determine a risk profile cyber security adjustment for each category of risk profile data using trained cyber security adjustment machine learning model 156. In an embodiment, cyber security adjustment machine learning model 156 may be trained using risk profile cyber security adjustment training data to determine a relationship between an input of a plurality of risk profile data to calculate an output of risk profile cyber security adjustment.

With further reference to FIG. 1, in some embodiments, processor 104 may be configured to solve at least an optimization problem, which may be an objective function, to determine a cyber security adjustment based on risk score. An "objective function," as used in this disclosure, is a mathematical function with a solution set including a plurality of data elements to be compared. Processor 104 may compute a score, metric, ranking, or the like, associated with cyber security adjustment and select objectives to minimize and/or maximize the score/rank, depending on whether an optimal result is represented, respectively, by a minimal and/or maximal score; an objective function may be used by processor 104 to score each cyber security adjustment. At least an optimization problem may be based on one or more objectives, as described below. Processor 104 may determine a cyber security adjustment that optimizes the objective function based on the risk score. In various embodiments solving at least an optimization problem may be based on a combination of one or more factors. Each factor may be assigned a score based on predetermined variables. In some embodiments, the assigned scores may be weighted or unweighted.

With continued reference to FIG. 1, solving at least an optimization problem may include performing a greedy algorithm process, where optimization is performed by minimizing and/or maximizing an output of objective function. A "greedy algorithm" is defined as an algorithm that selects locally optimal choices, which may or may not generate a globally optimal solution. For instance, processor 104 may select objectives so that scores associated therewith are the best score for each goal. For instance, in non-limiting illustrative example, optimization may determine the cyber security adjustment based on an the at least one digital environment risk constraint.

Still referring to FIG. 1, the optimization problem may be formulated as a linear objective function, which processor 104 may optimize using a linear program such as without limitation a mixed-integer program. A "linear program," as used in this disclosure, is a program that optimizes a linear objective function, given at least a constraint; a linear program may be referred to without limitation as a "linear optimization" process and/or algorithm. For instance, in non-limiting illustrative examples, a given constraint might be a budget constraint associated with the digital environment, and a linear program may use a linear objective function to calculate a cyber security adjustment based on the limit. In various embodiments, processor 104 may determine a set of risk remediation towards achieving a user's goal that maximizes digital security for the digital environment subject to a constraint. A mathematical solver may be implemented to solve for the set of instructions that maximizes scores; mathematical solver may be implemented on processor 104. At least an optimization problem may be formulated as nonlinear least squares optimization process. A "nonlinear least squares optimization process," for the purposes of this disclosure, is a form of least squares analysis used to fit a set of m observations with a model that is non-linear in n unknown parameters, where m is greater than or equal to n. The basis of the method is to approximate the model by a linear one and to refine the parameters by successive iterations. A nonlinear least squares optimization process may output a fit of signals to at least a propulsor. Solving at least an optimization problem may include minimizing a loss function, where a "loss function" is an expression an output of which a ranking process minimizes to generate an optimal result. As a non-limiting example, processor 104 may assign variables relating to a set of parameters, which may correspond to the at least one digital environment risk constraint as described above, calculate an output of mathematical expression using the variables, and select an objective that produces an output that maximizes digital security levels for the digital environment. Selection of different loss functions may result in identification of different potential cyber security adjustments as maximizing digital security levels.

Still referring to FIG. 1, the optimization problem may include, but is not limited to, continuous optimization, bound constrained optimization, constrained optimization, derivative-free optimization, discrete optimization, global optimization, and/or nondifferentiable optimization. The optimization function may include minimizing a loss function, where a "loss function" is an expression an output of which an optimization algorithm minimizes to generate an optimal result. As a non-limiting example, processor 104 may assign variables relating to a set of parameters, which may correspond to at least one digital environment risk constraint as described above, calculate an output of mathematical expression using the variables, and select an objective that produces an output that maximizes digital security levels for the digital environment. Selection of different loss functions may result in identification of different potential pairings as generating minimal outputs. The optimization problem may include a plurality of parameters. The plurality of parameters may include, but is not limited to, any of the at least one digital environment risk constraints as described above. In some embodiments, the optimization problem may maximize one or more parameters. In some embodiments, the optimization problem may minimize one or more parameters. In some embodiments, the optimization problem may include one or more constraints that may be placed on one or more parameters. In a non-limiting example, a constraint may be placed on a budget for the at least one cyber security adjustment. In another non-limiting example, a constraint may be placed on a time available for implementation of the at least one cyber security adjustment. In some embodiments, the optimization problem may minimize resources necessary (e.g. time and money) and/or other parameters. In other embodiments, the optimization problem may maximize parameters such as, but not limited to, digital security levels for the digital environment.

With continued reference to FIG. 1, the optimization problem may predict at least one cyber security adjustment with the highest priority based on minimization of resource consumption. In a non-limiting example, the optimization problem may predict at least one cyber security adjustment that needs urgent attention. In such an example, other parameters may be at non-optimal values that may allow for the cyber security adjustment to be addressed immediately. In such an example, the other parameters may be optimized second to the minimization of resource consumption. In some embodiments, one or more parameters may be weighted. The weight of the parameters may include an emphasis on certain parameters, such as, but not limited to, resources consumption and/or time constraints. In other embodiments, other parameters may be weighted which may allow said parameters to more heavily influence the optimization problem and the cyber security adjustment.

With further reference to FIG. 1, processor 104 may be configured to generate a ranked list of the at least one cyber security adjustment 152. For example, processor 104 may generate an ordered list ranking each cyber security adjustment 152 based on an objective function. Such a list may indicate a priority associated with each cyber security adjustment for digital environment. In an embodiment, the at least one cyber security adjustment 152 may be a ranked list of each of the cyber security adjustments 152 based on objective function for a digital environment 116. Additionally, processor 104 may also be configured to generate a ranked list of cyber profile category cyber security adjustments based on the objective function. For example, processor 104 may generate an ordered list ranking remediation actions for each of user data associated with digital assets, protective asset data, and digital asset data in order. Such a list may indicate cyber security adjustment for user data associated with digital assets having the highest priority and/or effect on the cyber security weakness, cyber security adjustment for protective asset data has lower priority than remediation action for user data associated with digital assets but higher priority than remediation action for digital asset data. In an embodiment, ranked list of cyber security adjustments for categories of the cyber profile may be included as a part of at least one cyber security adjustment 152. In an embodiment, processor 104 may be configured to generate ranked list for each of the categories of risk profile data and categories of cyber profile based on objective function. The ranked list for each category of the risk profile data and each category of the cyber profile may be ranked in manner similar to the ranking of the cyber profile category cyber security adjustments as described above.

Continuing in reference to FIG. 1, generating the ranked list of the at least one recommended risk remediation action may include ranking, using a ranking machine-learning model, at least one recommended risk remediation action 128 as a function of risk score. A ranking machine-learning model may be a machine-learning algorithm, such as a supervised machine-learning algorithm, as described above, which may rank elements based on some criteria, such as digital environment remediation constraint. A ranking algorithm may be any algorithm, as described above, for classification, wherein classification may be performed as a ranking of inputs to generate outputs classified into a ranked list, provided a criterion for ranking. In non-limiting illustrative examples, the ranking may be a limitation logistic regression and/or naive Bayes ranking algorithm, nearest neighbor algorithm such as k-nearest neighbors, support vector machines, least squares support vector machines, fisher's linear discriminant, quadratic classifiers, decision trees, boosted trees, random forest classifiers, learning vector quantization, and/or neural network-based algorithms. In non-limiting illustrative examples, ranking criteria used by a ranking machine-learning process 140 for ranking the at least one recommended risk remediation action may include ranking based on the at least one digital environment remediation constraint. However, the ranking machine learning model may be configured to rank based on any ranking criteria.

Still referring to FIG. 1, the processor 104 may be configured to generate the ranked list of the at least one recommended risk remediation action 128 based on an impact on digital environment 116. In such an embodiment, the processor 104 may be configured to determine an impact of each of the at least one risk remediation actions 128 on the digital environment 116. Additionally, or alternatively, the processor 104 may generate a remediation impact machine learning model configured to determine a change in the security level of the digital environment as a function of the at least one recommended risk remediation action 128. The remediation impact machine learning model may be trained using remediation impact training data. The remediation impact training data may include risk remediation actions data correlated to data indicating a change in security for digital environments resulting from the implementation of the remediation actions. Training data may be received through user input, external computing devices, and/or previous iterations of processing. The processor 104 may be configured to generate the ranked list of the at least one recommended risk remediation action 128 based on the determined change in the security level of the digital environment for each of the at least one risk remediation action.

With continued reference to FIG. 1, the processor 104 may be configured to aggregate the at least one recommended risk remediation action, cyber profile category risk remediation action, and risk profile category risk remediation action. In an embodiment, the aggregating the at least one recommended risk remediation action, cyber profile category risk remediation action, and risk profile category risk remediation action may include detecting a redundancy within the at least one recommended risk remediation action, cyber profile category risk remediation action, and risk profile category risk remediation action. As used in this disclosure, a "redundancy" is an overlap between at least two risk remediation actions for the digital environment. In such an embodiment, the processor may be configured to eliminate any redundancies within the risk remediation actions to prevent the same risk remediation action being implemented multiple times. Further, the processor 104 may be configured to determine a category intersection for a risk remediation action of the at least one risk remediation action. As used in this disclosure, a "category intersection" is an occurrence when a remediation action impacts a plurality of cyber profile categories and/or risk profile categories. Further, when a category intersection is determined, the processor 104 may be configured to assign a higher level of relative importance to the associated remediation action. Furthermore, the processer 104 may be configured to generate the ranked list of the at least one recommended risk remediation action based on the higher level of relative importance of the remediation action. For example, the processor 104 may determine increasing user account restrictions as a remediation action that may impact both the user data and the cyber-attack protection for the digital environment and the processor 104 may be configured to move increasing user account restrictions higher on the ranked list of the at least one recommended risk remediation action.

Still referring to FIG. 1, the processor 104 may be configured to generate a cyber profile summary of the cyber profile data. As used in this disclosure, "cyber profile summary" is data structure representing an overview of the cyber profile 112 that may be used for decision-making associated with implementation of cyber security for the digital environment 116; cyber profile summary may include an initial display of data having less information than cyber profile. For example, cyber profile summary may highlight a category of cyber profile having a highest calculated contribution score and having a greatest detrimental impact on risk score. Additionally, or alternatively, cyber profile summary may include a layered structure of cyber profile data. As used in this disclosure, "layered structure" is a specialized formatting of data on a computer so that the information can be organized, processed, stored, and retrieved quickly and effectively in a plurality of layers, wherein each layer comprises additional and more detailed information. In an exemplary embodiment, a layered structure may include an overview of cyber profile data on a first layer and more detailed cyber profile data in a second layer. Layered structure may include any number of layers and may be customized based on a desired amount of information to be displayed on each layer. Layered structure for cyber profile data may be configured to display additional cyber profile data based on a user interaction (e.g., clicks on, selected, and the like) on a graphical user interface (GUI), such as GUI 160. In an exemplary embodiment, layered structure may comprise a first layer, a second layer, and a third layer of cyber profile data. In such an embodiment, first layer may be category of cyber profile having the highest calculated contribution score, second layer may be categories of cyber profile having the three highest calculated contribution scores, and third layer may be a full list of categories of cyber profile sorted by highest calculated contribution scores.

Continuing to reference FIG. 1, in an embodiment, processor 104 may be configured to generate each layer of the layered structure for cyber profile data. Each layer of layered structure may be tailored by processor 104 to allow a user (e.g., network administrator, company executive, and the like) to quickly comprehend the data presented and make an informed decision regarding cyber security for digital environment. In an embodiment, each layer of the layered structure may be determined based on a comprehension factor. As used in this disclosure, "comprehension factor" is a measure of how quickly a layer of layered structure can be read and comprehended by user. For example, some comprehension factors that may be used may be readability for a user, ease of navigation of the data for a user, maximum data comprehension for the user, and the like. As used in this disclosure, "readability" is a measure of how easy each layer of layered structure is to read for a user. Additionally, or alternatively, processor 104 may be configured to solve at least an optimization problem, which may be an objective function, to generate each layer of layered structure for cyber profile data based on comprehension factor. Processor 104 may be configured to solve optimization problem in a manner similar to optimization problems as described herein.

With continued reference to FIG. 1, processor 104 may be configured to generate each layer of layered structure for cyber profile data using a machine learning model, such as a layer machine learning model. Layer machine learning model may be generated and trained using layer training data. The layer training data correlates a plurality of cyber profile data to each of a plurality of historical layers for historical layered structures. Further, processor 104 may be configured to determine each layer of layered structure for cyber profile data using trained layer machine learning model.

Continuing to reference FIG. 1, layers of layered structure for cyber profile data may be organized by categories of cyber profile. For example, layers of cyber profile may be organized by digital asset profile data, user data, protective asset data, and the like. Additionally, or alternatively, layers may also be organized based on risk scores, contribution scores, and the like. One skilled in the art will recognize other various possible variations of organization of layers for layered structure for cyber profile data that may be used to organize cyber profile data in layers of layered structure for cyber profile data.

Still referring to FIG. 1, processor 104 may be configured to generate a risk profile summary of risk profile data. As used in this disclosure, "risk profile summary" is an overview of risk profile 112 that may be used for decision-making associated with implementation of cyber security for digital environment 116. For example, cyber profile summary may highlight a category of risk profile having highest calculated contribution score and having the greatest detrimental impact on risk score. Additionally, or alternatively, risk profile summary may include a layered structure for risk profile data. Layered structure for cyber profile data may be configured to display additional cyber profile data based on a user interaction (e.g., clicks on, selected, and the like) on a graphical user interface (GUI), such as GUI 160. In an exemplary embodiment, layered structure may comprise a first layer, a second layer, and a third layer of risk profile data. In such an embodiment, first layer may be category of risk profile having the highest calculated contribution score, second layer may be categories of risk profile having three highest calculated contribution scores, and third layer may be a full list of categories of risk profile sorted by highest calculated contribution scores.

Continuing to reference FIG. 1, in an embodiment, processor 104 may be configured to generate each layer of the layered structure for risk profile data. Each layer of layered structure may be tailored by processor 104 to allow a user (e.g., network administrator, company executive, and the like) to quickly comprehend the data presented and make an informed decision regarding cyber security for digital environment. In an embodiment, each layer of the layered structure may be determined based on a comprehension factor, such as readability for a user, ease of navigation of the data for a user, maximum data comprehension for the user, and the like. Additionally, or alternatively, processor 104 may be configured to solve at least an optimization problem, which may be an objective function, to generate each layer of layered structure for risk profile data based on comprehension factor. Processor 104 may be configured to solve optimization problem in a manner similar to optimization problems as described herein.

With continued reference to FIG. 1, processor 104 may be configured to generate each layer of layered structure for risk profile data using a machine learning model, such as a layer machine learning model. Layer machine learning model may be generated and trained using layer training data. The layer training data correlates a plurality of risk profile data to each of a plurality of historical layers for historical layered structures. Further, processor 104 may be configured to determine each layer of layered structure for risk profile data using trained layer machine learning model.

Continuing to reference FIG. 1, layers of layered structure for risk profile data may be organized by categories of risk profile. For example, layers of risk profile may be organized by cyber-attack protection data, degree of single points of failure data, and cyber-attack recovery protocol data, and the like. Additionally, or alternatively, layers may also be organized based on risk scores, contribution scores, and the like. One skilled in the art will recognize other various possible variations of organization of layers for layered structure for risk profile data that may be used to organize risk profile data in layers of layered structure for risk profile data.

Still referring to FIG. 1, processor 104 may be configured to generate a cyber security weakness summary of at least one cyber security weakness 132. As used in this disclosure, "cyber security weakness summary" is an overview of the detected at least one cyber security weakness 132 that may be used for decision-making associated with implementation and/or adjustment of cyber security for digital environment 116. For example, cyber profile summary may highlight a cyber security weakness 132 based on risk scores associated with each of the at least one cyber security weakness, risk profile category security weakness, and/or cyber profile category weakness. Additionally, or alternatively, cyber security weakness summary may include a layered structure for the at least one cyber security weakness. Layered structure for the at least one cyber security weakness may be configured to display additional information relating to the at least one cyber security weakness based on a user interaction (e.g., clicks on, selected, and the like) on a graphical user interface (GUI), such as GUI 160. In an exemplary embodiment, layered structure may comprise a first layer, a second layer, and a third layer of the at least one cyber security weakness. In such an embodiment, first layer may be a cyber security weakness with highest calculated risk score, second layer may be cyber security weaknesses having three highest calculated risk scores, and third layer may be a full list of cyber security weaknesses for digital environment sorted by highest calculated contribution scores.

Continuing to reference FIG. 1, in an embodiment, processor 104 may be configured to generate each layer of the layered structure for the detected at least one cyber security weakness 132. Each layer of layered structure may be tailored by processor 104 to allow a user (e.g., network administrator, company executive, and the like) to quickly comprehend the data presented and make an informed decision regarding cyber security for digital environment. In an embodiment, each layer of the layered structure may be determined based on a comprehension factor, such as readability for a user, ease of navigation of the data for a user, maximum data comprehension for the user, and the like. Additionally, or alternatively, processor 104 may be configured to solve at least an optimization problem, which may be an objective function, to generate each layer of layered structure for the detected at least one cyber security weakness 132 based on comprehension factor. Processor 104 may be configured to solve optimization problem in a manner similar to optimization problems as described herein.

With continued reference to FIG. 1, processor 104 may be configured to generate each layer of layered structure for the detected at least one cyber security weakness 132 using a machine learning model, such as a layer machine learning model. Layer machine learning model may be generated and trained using layer training data. The layer training data correlates a plurality of the detected at least one cyber security weakness to each of a plurality of historical layers for historical layered structures. Further, processor 104 may be configured to determine each layer of layered structure for the detected at least one cyber security weakness using trained layer machine learning model.

Continuing to reference FIG. 1, layers of layered structure for the detected at least one cyber security weakness may be organized by categories of cyber profile and/or risk profile. For example, layers of risk profile may be organized by digital asset profile data, user data, protective asset data, cyber-attack protection data, degree of single points of failure data, cyber-attack recovery protocol data, and the like. Additionally, or alternatively, layers may also be organized based on risk scores, contribution scores, and the like. One skilled in the art will recognize other various possible variations of organization of layers for layered structure for the detected at least one cyber security weakness 132 that may be used to organize the detected at least one cyber security weakness in layers of layered structure for risk profile data.

Continuing to reference FIG. 1, processor 104 may be configured to generate a cyber security adjustment summary of the at least one cyber security adjustment 152. As used in this disclosure, "cyber security adjustment summary" is an overview of actions that may be implemented to secure digital environment 116 that may be used for decision-making associated with implementation and/or adjustment of cyber security for digital environment 116. For example, cyber security adjustment summary may highlight a cyber security adjustment 152 based on the determined cyber security adjustment that optimizes objective function based on risk score. Additionally, or alternatively, cyber security adjustment summary may include a layered structure for the at least one cyber security adjustment. Layered structure for the at least one cyber security adjustment may be configured to display additional information relating to the at least one cyber security adjustment based on a user interaction (e.g., clicks on, selected, and the like) on a graphical user interface (GUI), such as GUI 160. In an exemplary embodiment, layered structure may comprise a first layer, a second layer, and a third layer of at least one cyber security adjustment. In such an embodiment, first layer may be a cyber security adjustment that optimizes risk score based on objective function, second layer may be the top three cyber security adjustments that optimize risk score based on objective function, and third layer may be a full list of cyber security adjustments for digital environment sorted by optimization of risk score using objective function. Further, processor 104 may be configured to configure the user interface data structure to display and include the cyber security adjustment summary comprising a layered structure of the at least one cyber security adjustment.

Continuing to reference FIG. 1, in an embodiment, processor 104 may be configured to generate each layer of the layered structure for the at least one cyber security adjustment. Each layer of layered structure may be tailored by processor 104 to allow a user (e.g., network administrator, company executive, and the like) to quickly comprehend the data presented and make an informed decision regarding cyber security for digital environment. In an embodiment, each layer of the layered structure may be determined based on a comprehension factor, such as readability for a user, ease of navigation of the data for a user, maximum data comprehension for the user, and the like. Additionally, or alternatively, processor 104 may be configured to solve at least an optimization problem, which may be an objective function, to generate each layer of layered structure for at least one cyber security adjustment based on comprehension factor. Processor 104 may be configured to solve optimization problem in a manner similar to optimization problems described herein.

With continued reference to FIG. 1, processor 104 may be configured to generate each layer of layered structure for at least one cyber security adjustment using a machine learning model, such as a layer machine learning model. Layer machine learning model may be generated and trained using layer training data. Layer training data may correlate a plurality of the at least one cyber security adjustment to each of a plurality of historical layers for historical layered structures. Further, processor 104 may be configured to determine each layer of layered structure for the at least one cyber security adjustment using trained layer machine learning model.

Continuing to reference FIG. 1, layers of layered structure for the at least one cyber security adjustment may be organized by categories of cyber profile and/or risk profile. For example, layers of risk profile may be organized by digital asset profile data, user data, protective asset data, cyber-attack protection data, degree of single points of failure data, cyber-attack recovery protocol data, and the like. Additionally, or alternatively, layers may also be organized based on risk scores, contribution scores, and the like. One skilled in the art will recognize other various possible variations of organization of layers for layered structure for the at least one cyber security adjustment that may be used to organize the detected at least one cyber security weakness in layers of layered structure for risk profile data.

With continued reference to FIG. 1, processor 104 may be configured to generate a user interface data structure 164 configured to display and including cyber profile summary of cyber profile data. Additionally, or alternatively, processor 104 may be configured to generate user interface data structure 164 any combination of cyber profile summary, risk profile summary, cyber security weakness summary, and cyber security adjustment summary. User interface data structure 164 may allow cyber profile summary, cyber profile data, risk profile summary, risk profile data, cyber security weakness summary, at least one cyber security weakness, cyber security adjustment summary, and at least one cyber security adjustment to be displayed on a display, graphical user interface, and the like. Cyber profile summary, risk profile summary, cyber security weakness summary, and cyber security weakness summary may be reviewed by a user, network administrator for digital environment, and any other decisionmakers for digital environment to gather information quickly and efficiently about potential security solutions for digital environment 116 that may need to be addressed to prevent and/or minimize the effects of a cyber-attack. Additionally, layered structure for cyber profile data, risk profile data, at least one cyber security weakness, and at least one cyber security adjustment may provide additional information about potential security solutions for digital environment 116 that may need to be addressed to prevent and/or minimize effects of a cyber-attack.

Continuing to refer to FIG. 1, processor 104 is communicatively connected to a graphical user interface (GUI) 160 configured to display any information from apparatus 100 and/or any computing device. GUI 160 may be configured to be displayed on, without limitation, a display; the display may include any display as described in the entirety of this disclosure such as a light emitting diode (LED) screen, liquid crystal display (LCD), organic LED, cathode ray tube (CRT), touch screen, or any combination thereof.

With further reference to FIG. 1, GUI 160 may be configured to receive user interface data structure 164 for any combination of cyber profile summary, risk profile summary, cyber security weakness summary, and cyber security adjustment summary. Additionally, or alternatively, GUI 160 may be configured to display cyber profile summary, risk profile summary, cyber security weakness summary, and cyber security adjustment summary, on a respective portion of GUI 160 for review by a user, network administrator for digital environment, and any other decisionmakers for digital environment to gather information about potential security solutions for digital environment 116 that may need to be addressed to prevent and/or minimize the effects of a cyber-attack. For example, cyber profile summary may be displayed on a first portion of GUI 160, risk profile summary may be displayed on a second portion of GUI 160, cyber security weakness summary may be displayed on a third portion of GUI 160, and cyber security adjustment summary on a fourth portion of GUI 160.

Continuing to reference FIG. 1, GUI 160 may be configured to receive a user input. In an embodiment, GUI 160 may be configured to receive a user input that selects (e.g., click on, interacts with, and the like) any portion of GUI 160. For example, portions of the GUI 160 may be a first portion displaying a cyber profile summary, a second portion displaying a risk profile summary, a third portion displaying a cyber security weakness summary, and a fourth portion displaying a cyber security adjustment summary, as described above, and any portion of GUI may be selected by the user. Additionally, GUI may be configured to display a subsequent layer of a layered structure of data as a function of user input. For example, GUI 160 may be configured to receive a user input selecting a third portion of GUI 160, where cyber security weakness summary may be displayed, and GUI 160 may be configured to display for example, a second layer of layered structure of cyber security weakness summary.

Figure 2:
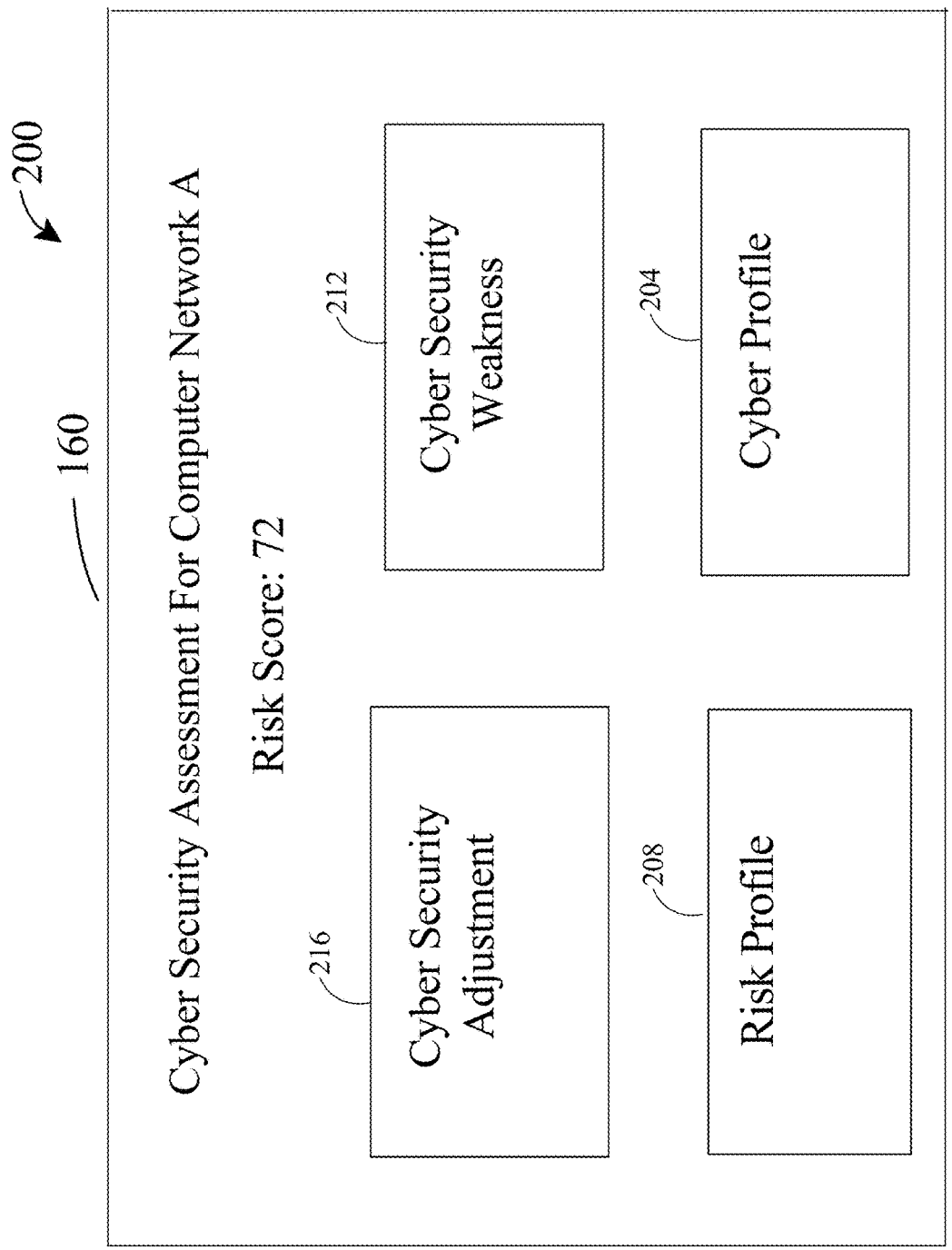
FIG. 2 is an exemplary embodiment of a graphical user interface.

Now referencing FIG. 2, an exemplary embodiment 200 of GUI 160 is shown. As used in the current disclosure, a "graphical user interface" may include a plurality of lines, images, symbols. GUI 200 may be displayed on a display device. Display device may include, but is not limited to, a smartphone, tablet, laptop, monitor, tablet, and the like. Display device may include a separate device that includes a transparent screen configured to display computer generated images and/or information. The user may view the information displayed on the display device in real time. In the exemplary embodiment 200, the GUI 160 may include a first portion 204, second portion 208, third portion 212, and fourth portion 216 of the GUI, but is not limited to such an embodiment. First portion 204 may be configured to display the cyber profile summary. Second portion 208 may be configured to display a risk profile summary. Third portion 212 may be configured to display a cyber security weakness summary. Fourth portion may be configured to display a cyber security adjustment summary. Cyber profile summary may be consistent with any cyber profile summary as discussed herein. Risk profile summary may be consistent with any risk profile summary as discussed herein. Cyber security weakness summary may be consistent with any cyber security weakness summary as discussed herein. Cyber security adjustment summary may be consistent with any cyber security adjustment summary as discussed herein.

Figure 3:
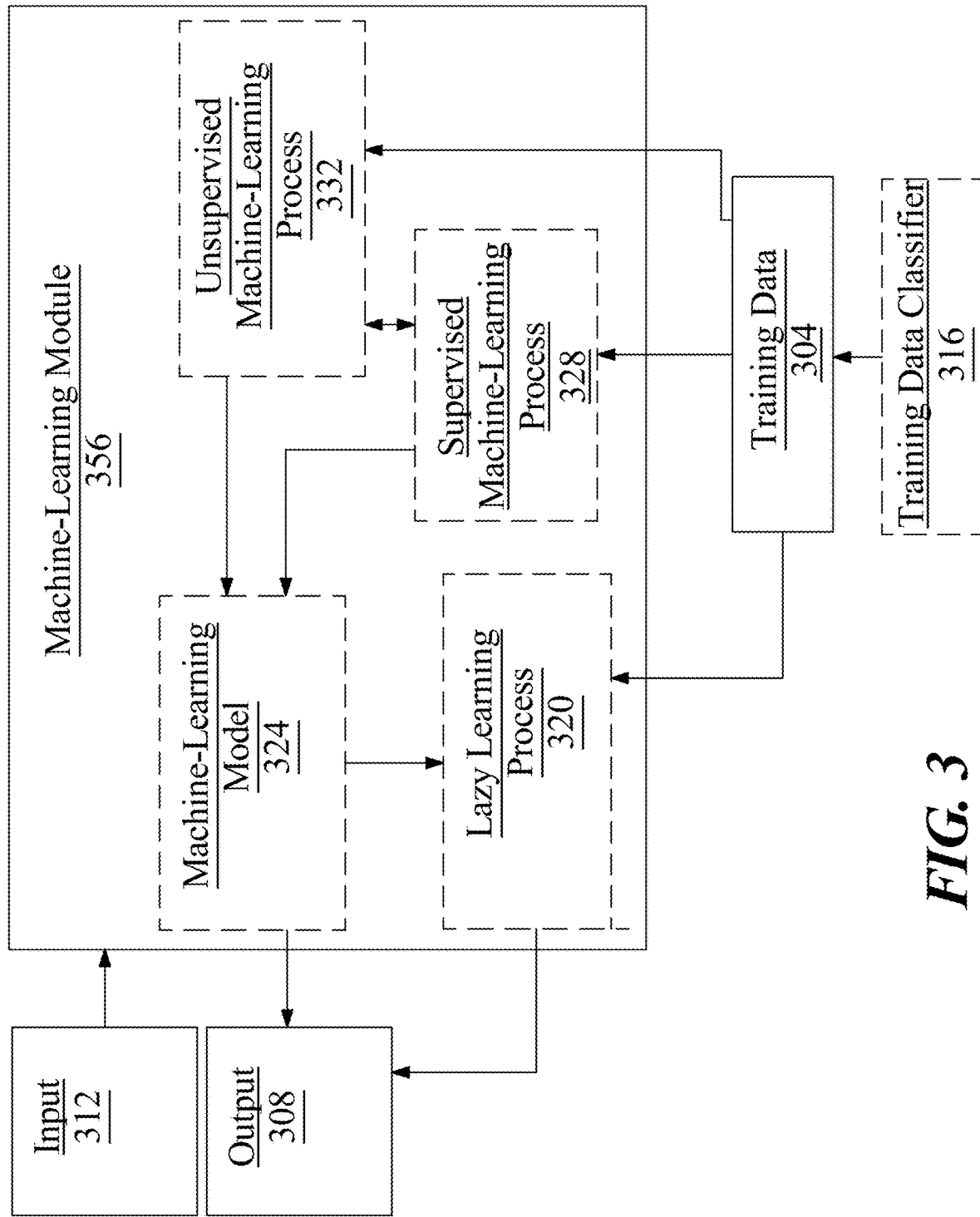
FIG. 3 is an exemplary embodiment of a machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, a user profile may be an input and a predictive quantifier may be an output.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to categories of total cryptographic capital return for which a subset of training data may be selected.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors' algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any input as described above as inputs, any output as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Now referencing FIG. 4, an exemplary embodiment 400 of database 128 is shown. Database 128 may be implemented, without limitation, as a relational database, a key-value retrieval database such as a NOSQL database, or any other format or structure for use as a database that a person skilled in the art would recognize as suitable upon review of the entirety of this disclosure. A key-value retrieval database may include any key such as voice activation. Database 128 may alternatively or additionally be implemented using a distributed data storage protocol and/or data structure, such as a distributed hash table or the like. Database 128 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. Database 128 may be used to store cyber profile 404, risk profile data 408, cyber-attack protection quote 412, cyber security weakness training data 416, risk score training data 420, protection quote training data 424, and the like. Cyber profile 404 may be consistent with any cyber profiles as discussed above. Risk profile 408 may be consistent with any risk profile data as discussed herein. Cyber-attack protection quote 412 may be consistent with any security action as discussed herein. Cyber security weakness training data 416, risk score training data 420, and protection quote training data 424 may be consistent with any training data as discussed herein.

Figure 5:
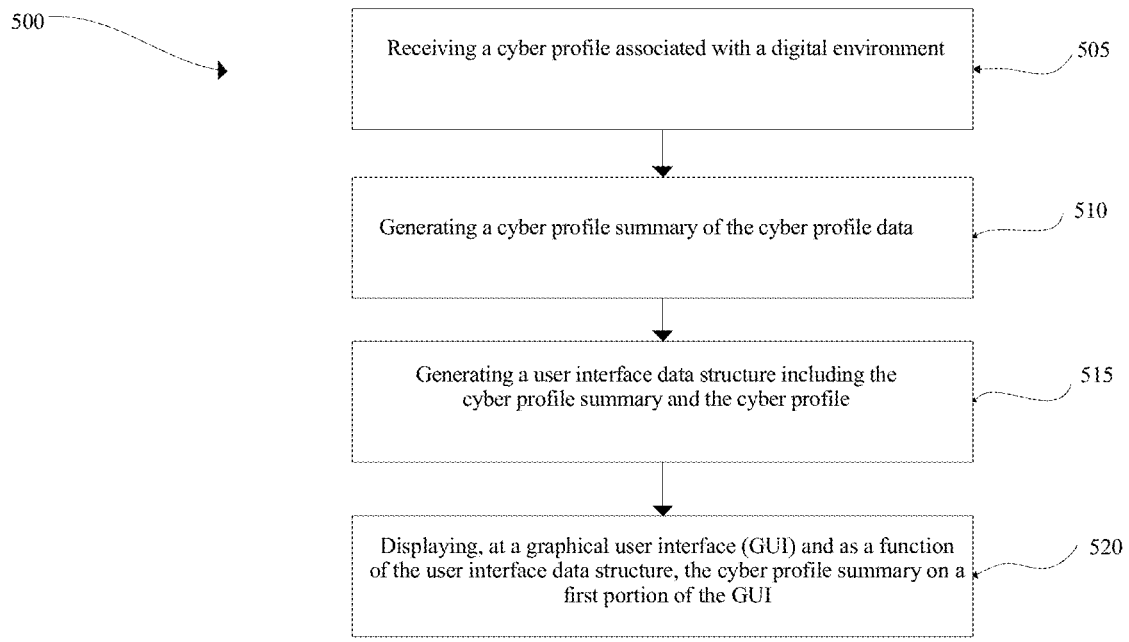
FIG. 5 is a flow diagram illustrating a method of determining a risk associated with a cyber-attack.

Referring now to FIG. 5, an exemplary embodiment of method 500 for intelligent processing of cyber security risk assessment data is shown. Step 505 of method 500 includes receiving, by a processor, cyber profile data for a cyber profile associated with a digital environment. This may be implemented, without limitation, as described above in reference to FIGS. 1-4.

Still referring to FIG. 5, step 510 of method 500 includes generating, by the processor, a cyber profile summary comprising a layered structure of the cyber profile data. This may be implemented, without limitation, as described above in reference to FIGS. 1-4.

With further reference to FIG. 5, step 515 of method 500 includes generating, by the processor, a user interface data structure including the cyber profile summary and the layered structure of the cyber profile. This may be implemented, without limitation, as described above in reference to FIGS. 1-4.

Continuing to reference FIG. 5, step 520 of method 500 includes displaying, at a graphical user interface (GUI) and as a function of the user interface data structure the cyber profile summary on a first portion of the GUI. This may be implemented, without limitation, as described above in reference to FIGS. 1-4.

Continuing to reference FIG. 5, the method 500 may further comprise receiving, by the GUI, a user input selecting the first portion of the GUI; and displaying, by the GUI, the cyber profile data on the first portion of the GUI as a function of the user input. Additionally, or alternatively, the method 500 may further include receiving, by the processor, risk profile data for a risk profile associated with the digital environment, generating, by the processor, a risk profile summary comprising a layered structure of the risk profile data and generating, by the processor, the user interface data structure that is further configured to display and include the risk profile summary and the layered structure of the risk profile data. These may be implemented, without limitation, as described above in reference to FIGS. 1-4.

Still referring to FIG. 5, the method 500 may include receiving, by the GUI, the user interface data structure further configured to display and including the risk profile summary and the risk profile data and displaying, by the GUI, the risk profile summary on a second portion of the GUI. Additionally, or alternatively, the method 500 may include receiving, by the GUI, a user input selecting the second portion of the GUI and displaying, by the GUI, the risk profile data on the second portion of the GUI as a function of the user input. These may be implemented, without limitation, as described above in reference to FIGS. 1-4.

With further reference to FIG. 5, the method 500 may include detecting, by the processor, at least one cyber security weakness in the digital environment based on the cyber profile data and the risk profile data, generating, by the processor, a cyber security weakness summary as a function of the at least one cyber security weakness and further configuring, by the processor, the user interface data structure to display and include the cyber security weakness summary. Additionally, cyber security weakness summary may comprise a layered structure of the at least one cyber security weakness, and generating, by the processor, the user interface data structure that is further configured to display and include the cyber security weakness summary comprising the layered structure of the at least one cyber security weakness. Additionally or alternatively, the method 500 may include receiving, by the GUI, the user interface data structure that is further configured to display and include the cyber security weakness summary comprising the layered structure of the at least one cyber security weakness and displaying, by the GUI, the cyber security weakness summary on a third portion of the GUI. Additionally, or alternatively, the method 500 may include receiving, by the GUI, a user input selecting the third portion of the GUI and displaying, by the GUI, the layered structure of the risk profile data on the third portion of the GUI as a function of the user input. These may be implemented, without limitation, as described above in reference to FIGS. 1-4.

Still referring to FIG. 5, the method 500 may include determining, by the processor, at least one cyber security adjustment based on the at least one cyber security weakness, generating, by the processor, a cyber security adjustment summary comprising a layered structure of the at least one cyber security adjustment, and configuring, by the processor, the user interface data structure to display and include the cyber security adjustment summary comprising the layered structure of the at least one cyber security adjustment. Additionally, or alternatively, the method 500 may include receiving, by the GUI, the user interface data structure that is further configured to display and include the cyber security adjustment summary comprising a layered structure of the at least one cyber security adjustment, displaying, by the GUI, the cyber security adjustment summary on a fourth portion of the GUI, receiving, by the GUI, a user input selecting the fourth portion of the GUI, and displaying, by the GUI, the layered structure of the at least one cyber security adjustment on a fourth portion of the GUI as a function of the user input. These may be implemented, without limitation, as described above in reference to FIGS. 1-4.

Figure 6:
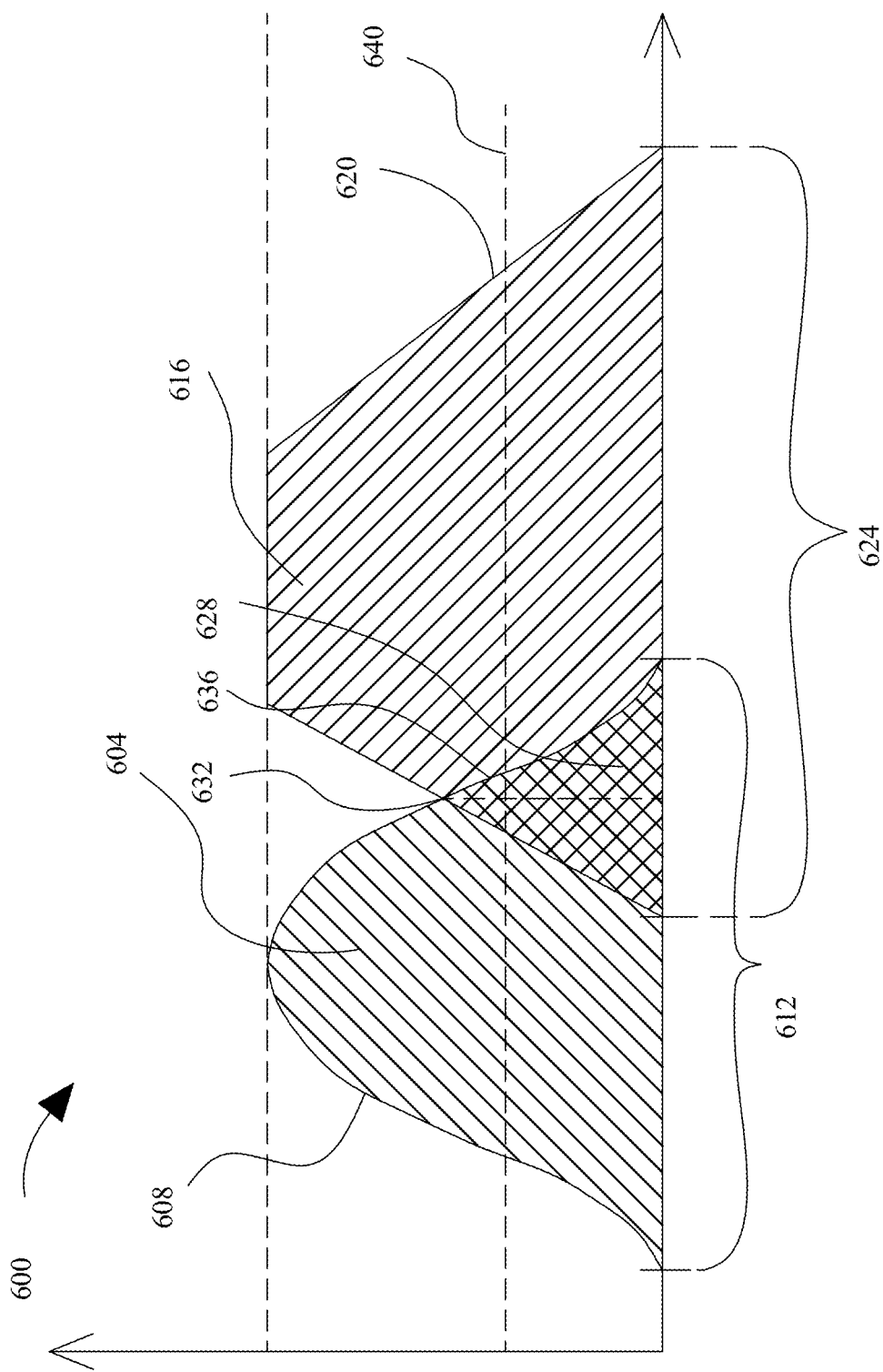
FIG. 6 is a schematic diagram illustrating an exemplary embodiment of a fuzzy inferencing system.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 662 representing a probability, as defined on probability interval, of a match between first fuzzy set 604 and second fuzzy set 616. Alternatively, or additionally, a single value of first and/or second fuzzy set may be located at a locus 666 on first range 612 and/or second range 624, where a probability of membership may be taken by evaluation of first membership function 608 and/or second membership function 620 at that range point. A probability at 628 and/or 662 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models, for combination to occur as described above. Alternatively, or additionally, each threshold may be tuned by a machine-learning and/or statistical process, for instance and without limitation as described in further detail below.

Further referring to FIG. 6, in an embodiment, a degree of match between fuzzy sets may be used to classify data from the cyber profile and/or the risk profile with at least one corresponding recommended risk remediation action. For example, if digital asset profile data has a fuzzy set matching an update digital asset software fuzzy set by having a degree of overlap exceeding a threshold, computing device 104 may determine updating digital asset software as one of the at least one recommended risk remediation action. Where multiple fuzzy matches are performed, degrees of match for each respective fuzzy set may be computed and aggregated through, for instance, addition, averaging, or the like, to determine an overall degree of match.

Still referring to FIG. 6, in an embodiment, data from the cyber profile and/or the risk profile may be compared to multiple recommended risk remediation action fuzzy sets. For instance, a user data, as described above, may be represented by a fuzzy set that is compared to each of the multiple recommended risk remediation action fuzzy sets; and a degree of overlap exceeding a threshold between the user data fuzzy set and any of the multiple recommended risk remediation action fuzzy sets may cause computing device 104 to identify each of the recommended risk remediation actions as recommended risk remediation actions of the at least one recommended risk remediation actions. For instance, in one embodiment there may be two risk remediation action fuzzy sets, representing respectively increasing user restriction data and increasing user account authentication data. A number of user accounts data may have a first fuzzy set; user account restriction data may have a second fuzzy set; and user data may have a user data fuzzy set. Processor 104, for example, may compare a user data fuzzy set with each of increasing user restriction data fuzzy set and increasing user account authentication fuzzy set, as described above, and identify either, both, or neither of increasing user restriction data nor increasing user account authentication as at least one recommended risk remediation action to user data. Machine-learning methods as described throughout may, in a non-limiting example, generate coefficients used in fuzzy set equations as described above, such as without limitation x, c, and a of a Gaussian set as described above, as outputs of machine-learning methods. Likewise, user response may be used indirectly to determine a fuzzy set, as user response fuzzy set may be derived from outputs of one or more machine-learning models that take the user response directly or indirectly as inputs.

Still referring to FIG. 3, a computing device may use a logic comparison program, such as, but not limited to, a fuzzy logic model to determine a compatibility score. A compatibility score may include, but is not limited to, high compatibility, mid compatibility, low compatibility, and the like; each such score may be represented as a value for a linguistic variable representing score, or in other words a fuzzy set as described above that corresponds to a degree of match of recommended risk remediation action as calculated using any statistical, machine-learning, or other method that may occur to a person skilled in the art upon reviewing the entirety of this disclosure. In other words, a given element of cyber profile and/or risk profile may have a first non-zero value for membership in a first linguistic variable value such as a recommended risk remediation action and a second non-zero value for membership in a second linguistic variable value such as degree of urgency. In some embodiments, determining a recommend risk remediation action may include using a linear regression model. A linear regression model may include a machine learning model. A linear regression model may be configured to map data of cyber profile and/or risk profile to one or more recommended risk remediation actions and degrees of urgency. A linear regression model may be trained using training data as discussed above. In some embodiments, determining a recommended risk remediation action may include using a recommended risk remediation action classification model. A recommended risk remediation action classification model may be configured to input collected data and cluster data to a centroid based on, but not limited to, frequency of appearance, and the like. Centroids may include compatibility scores assigned to them such that each cyber profile and risk profile may each be assigned a compatibility score. In some embodiments, an urgency classification model may include a K-means clustering model. In some embodiments, an urgency classification model may include a particle swarm optimization model. In some embodiments, determining a compatibility score of user response may user response using a fuzzy inference engine. A fuzzy inference engine may be configured to map one or more data elements using fuzzy logic. In some embodiments, a plurality of recommended risk remediation action may be arranged by a logic comparison program into compatibility score arrangements. An "compatibility score arrangement" as used in this disclosure is any grouping of objects and/or data based on degree of match for recommended risk remediation action. This step may be implemented as described above in FIGS. 1-2. Membership function coefficients and/or constants as described above may be tuned according to classification and/or clustering algorithms. For instance, and without limitation, a clustering algorithm may determine a Gaussian or other distribution of questions about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 6, an inference engine may be implemented according to input and/or output membership functions and/or linguistic variables. Continuing the example, an output linguistic variable may represent, without limitation, increasing a firewall setting level. An inference engine may combine rules, such as: "if the firewall level is 'low' and the vulnerability level is 'high', the security baseline is 'low'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
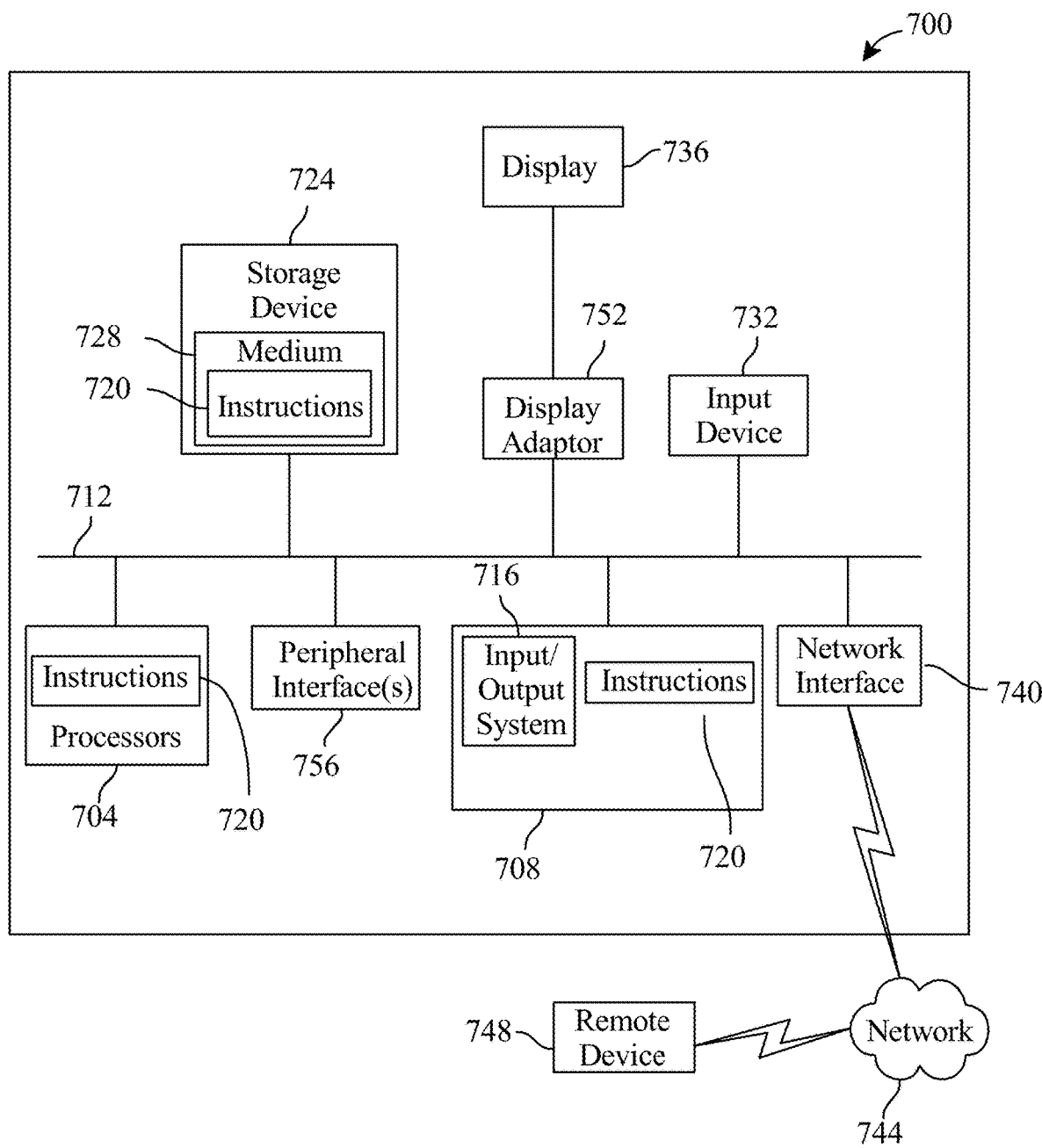
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for intelligent processing of cyber security risk assessment data, the apparatus comprising:
   at least a processor; and
   a memory communicatively coupled to the at least a processor, the memory containing instructions configuring the at least a processor to:
      receive cyber profile data associated with a digital environment;
      generate a cyber profile summary comprising a first layered structure of the cyber profile data, wherein generating the cyber profile summary comprises generating a plurality of layers for the first layered structure based on a comprehension factor;
      generate a user interface data structure including the cyber profile summary and the cyber profile; and
      display, at a graphical user interface (GUI) and as a function of the user interface data structure, the cyber profile summary on a first portion of the GUI.

2. The apparatus of claim 1, wherein the GUI is further configured to:
   receive a user input selecting the first portion of the GUI; and
   display the first layered structure of the cyber profile data on the first portion of the GUI as a function of the user input.

3. The apparatus of claim 1, wherein the memory further comprises instructions configuring the at least a processor to:
   receive risk profile data for a risk profile associated with the digital environment;
   generate a risk profile summary comprising a second layered structure of the risk profile data; and
   generate the user interface data structure to further include the risk profile summary and the risk profile data.

4. The apparatus of claim 3, wherein the GUI is further configured to display the risk profile summary on a second portion of the GUI.

5. The apparatus of claim 4, wherein the GUI is further configured to:
   receive a user input selecting the second portion of the GUI; and
   display the second layered structure of the risk profile data on the second portion of the GUI as a function of the user input.

6. The apparatus of claim 5, wherein the memory further comprises instructions configuring the at least a processor to:
   detect at least one cyber security weakness in the digital environment based on the cyber profile data and the risk profile data;
   generate a cyber security weakness summary as a function of the at least one cyber security weakness; and
   further configure the user interface data structure to display and include the cyber security weakness summary.

7. The apparatus of claim 6, wherein the GUI is further configured to display the cyber security weakness summary on a third portion of the GUI.

8. The apparatus of claim 7, wherein the GUI is further configured to:
   receive a user input selecting the third portion of the GUI; and
   display a layered structure of the risk profile data on the third portion of the GUI as a function of the user input.

9. The apparatus of claim 8, wherein the memory further comprises instructions configuring the at least a processor to:
   determine at least one cyber security adjustment based on the at least one cyber security weakness;
   generate a cyber security adjustment summary comprising a layered structure of the at least one cyber security adjustment; and
   configure the user interface data structure to display and include the cyber security adjustment summary comprising the layered structure of the at least one cyber security adjustment.

10. The apparatus of claim 9, wherein the GUI is further configured to display the cyber security adjustment summary on a fourth portion of the GUI;
    receive a user input selecting the fourth portion of the GUI; and
    display the layered structure of the at least one cyber security adjustment on a fourth portion of the GUI as a function of the user input.

11. A method for intelligent processing of cyber security risk assessment data, the method comprising:
    receiving, by a processor, cyber profile data for a cyber profile associated with a digital environment;
    generating, by the processor, a cyber profile summary of the cyber profile data, the cyber profile summary comprising a first layered structure of the cyber profile data, wherein generating the cyber profile summary comprises generating a plurality of layers for the first layered structure based on a comprehension factor;
    generating, by the processor, a user interface data structure including the cyber profile summary and the cyber profile; and
    displaying, at a graphical user interface (GUI) and as a function of the user interface data structure, the cyber profile summary on a first portion of the GUI.

12. The method of claim 11, further comprising:
    receiving, by the GUI, a user input selecting the first portion of the GUI; and
    display, by the GUI, the first layered structure of the cyber profile data on the first portion of the GUI as a function of the user input.

13. The method of claim 11, further comprising:
    receiving, by the processor, risk profile data for a risk profile associated with the digital environment;
    generating, by the processor, a risk profile summary comprising a second layered structure of the risk profile data; and
    generating, by the processor, the user interface data structure to further include the risk profile summary and the risk profile data.

14. The method of claim 13, further comprising:
    displaying, by the GUI, the risk profile summary on a second portion of the GUI.

15. The method of claim 14, further comprising:
receiving, by the GUI, a user input selecting the second portion of the GUI; and
displaying, by the GUI, the second layered structure of the risk profile data on the second portion of the GUI as a function of the user input.

16. The method of claim 13, further comprising:
detecting, by the processor, at least one cyber security weakness in the digital environment based on the cyber profile data and the risk profile data;
generating, by the processor, a cyber security weakness summary as a function of the at least one cyber security weakness; and
further configure the user interface data structure to display and include the cyber security weakness summary.

17. The method of claim 16, further comprising:
displaying, by the GUI, the cyber security weakness summary on a third portion of the GUI.

18. The method of claim 17, further comprising:
receiving, by the GUI, a user input selecting the third portion of the GUI; and
displaying, by the GUI, a layered structure of the risk profile data on the third portion of the GUI as a function of the user input.

19. The method of claim 18, further comprising:
determining, by the processor, at least one cyber security adjustment based on the at least one cyber security weakness;
generating, by the processor, a cyber security adjustment summary comprising a layered structure of the at least one cyber security adjustment; and
configure, by the processor, the user interface data structure to display and include the cyber security adjustment summary comprising the layered structure of the at least one cyber security adjustment.

20. The method of claim 17, further comprising
displaying, by the GUI, the cyber security adjustment summary on a fourth portion of the GUI;
receiving, by the GUI, a user input selecting the fourth portion of the GUI; and
displaying, by the GUI, the layered structure of the at least one cyber security adjustment on a fourth portion of the GUI as a function of the user input.

* * * * *